United States Patent
Tracey et al.

(10) Patent No.: US 7,714,043 B2
(45) Date of Patent: May 11, 2010

(54) TIRE INNERLINERS HAVING IMPROVED COLD TEMPERATURE PROPERTIES

(75) Inventors: Donald S. Tracey, Kingwood, TX (US); Andy H. Tsou, Allentown, PA (US); Bryan R. Chapman, Annandale, NJ (US); Bruce A. Harrington, Houston, TX (US); David B. Dunaway, Houston, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 0 days.

(21) Appl. No.: 12/402,211

(22) Filed: Mar. 11, 2009

(65) Prior Publication Data
US 2010/0076121 A9    Mar. 25, 2010

Related U.S. Application Data

(63) Continuation-in-part of application No. 11/323,747, filed on Dec. 30, 2005, now abandoned, which is a continuation-in-part of application No. 10/518,886, filed as application No. PCT/US03/16947 on May 30, 2003, now abandoned, said application No. 11/323,747 is a continuation-in-part of application No. 10/398,255, filed as application No. PCT/US01/42767 on Oct. 16, 2001, now Pat. No. 7,425,591, said application No. 11/323,747 is a continuation-in-part of application No. 09/691,764, filed on Oct. 18, 2000, now Pat. No. 6,710,116, application No. 12/402,211, which is a continuation-in-part of application No. 11/791,885, filed as application No. PCT/US2005/35052 on Sep. 30, 2005.

(60) Provisional application No. 60/639,939, filed on Dec. 29, 2004, provisional application No. 60/396,497, filed on Jul. 17, 2002, provisional application No. 60/294,808, filed on May 31, 2001.

(51) Int. Cl.
B29C 47/00 (2006.01)
D21H 18/58 (2006.01)

(52) U.S. Cl. .................................. 524/13; 524/52
(58) Field of Classification Search .................. 524/13
See application file for complete search history.

(56) References Cited

U.S. PATENT DOCUMENTS

| | | | |
|---|---|---|---|
| 3,166,608 A | 1/1965 | Natta et al. | |
| 5,063,268 A | 11/1991 | Young | |
| 5,333,662 A | 8/1994 | Costemalle et al. | |
| 5,386,864 A | 2/1995 | Costemalle et al. | |
| 5,391,625 A | 2/1995 | Arjunan | |
| 6,051,653 A | 4/2000 | McElrath et al. | |
| 6,293,327 B1 | 9/2001 | Minagawa et al. | |
| 6,624,220 B1 * | 9/2003 | Waddell et al. | 524/265 |
| 6,799,815 B2 | 10/2004 | Krishnan et al. | |
| 6,812,277 B2 | 11/2004 | Zanzig et al. | |
| 6,939,921 B2 | 9/2005 | Waddell et al. | |
| 7,294,664 B2 | 11/2007 | Jones et al. | |
| 7,328,733 B2 | 2/2008 | Tracey et al. | |
| 7,329,697 B2 | 2/2008 | Waddell et al. | |
| 2002/0100530 A1 | 8/2002 | McElrath et al. | |
| 2002/0151636 A1 | 10/2002 | Wada et al. | |
| 2004/0044118 A1 | 3/2004 | Waddell et al. | |
| 2004/0132894 A1 | 7/2004 | Dias et al. | |
| 2004/0242795 A1 | 12/2004 | Waddell et al. | |
| 2005/0027057 A1 | 2/2005 | Dias et al. | |
| 2005/0027062 A1 | 2/2005 | Waddell et al. | |
| 2005/0222335 A1 | 10/2005 | Jones et al. | |
| 2006/0079617 A1 | 4/2006 | Kappes et al. | |
| 2006/0167184 A1 | 7/2006 | Waddell et al. | |
| 2008/0125521 A1 * | 5/2008 | Waddell et al. | 524/13 |
| 2008/0188592 A1 | 8/2008 | Waddell et al. | |
| 2008/0188600 A1 | 8/2008 | Westwood et al. | |
| 2008/0262130 A1 | 10/2008 | Waddell et al. | |
| 2008/0281021 A1 | 11/2008 | Waddell et al. | |
| 2008/0281921 A1 | 11/2008 | Hunt | |
| 2008/0319119 A1 | 12/2008 | Waddell et al. | |
| 2009/0000718 A1 | 1/2009 | Rouckhout et al. | |
| 2009/0005493 A1 | 1/2009 | Tse | |
| 2009/0043049 A1 | 2/2009 | Chapman et al. | |
| 2009/0050251 A1 | 2/2009 | Tracey et al. | |
| 2009/0054575 A1 | 2/2009 | Tracey et al. | |

FOREIGN PATENT DOCUMENTS

| | | |
|---|---|---|
| EP | 0 922 732 | 6/1999 |
| EP | 1 331 107 | 6/2003 |
| JP | 2003/170438 | 6/2003 |
| JP | 2003/192854 | 7/2003 |
| WO | WO 92/02582 | 2/1992 |

(Continued)

OTHER PUBLICATIONS

U.S. Appl. No. 61/087,461, filed Aug. 8, 2008, Rodgers et al.
U.S. Appl. No. 11/842,523, filed Aug. 21, 2007, Tracey et al.
U.S. Appl. No. 11/842,568, filed Aug. 21, 2007, Tracey et al.

Primary Examiner—Ling-Siu Choi
Assistant Examiner—Hui Chin
(74) Attorney, Agent, or Firm—Jennifer Schmidt

(57) ABSTRACT

Provided are elastomeric compositions, such as a tire innerliner, comprising at least one isobutylene based elastomer and at least one hydrocarbon fluid additive ("HFA"). The compositions have improved cold temperature properties and are particularly useful as tire innerliners for an aircraft tire. The use of a HFA in the elastomeric composition may allow for the use of reduced amounts of secondary elastomers, such as natural rubber, while allowing for an improved balance in the composition's brittleness and permeability properties. Examples of useful HFAs include polyalphaolefins, high purity hydrocarbon fluids, and water white group III mineral oils.

27 Claims, 2 Drawing Sheets

FOREIGN PATENT DOCUMENTS

| | | |
|---|---|---|
| WO | WO 92/03302 | 3/1992 |
| WO | WO 02/32994 | 4/2002 |
| WO | WO 02/48257 | 6/2002 |
| WO | WO 02/100936 | 12/2002 |
| WO | WO 2004/058825 | 7/2004 |

* cited by examiner

US 7,714,043 B2

TIRE INNERLINERS HAVING IMPROVED COLD TEMPERATURE PROPERTIES

CROSS REFERENCE TO RELATED APPLICATIONS

This application is a continuation-in-part and claims the benefit of priority from U.S. patent application Ser. No. 11/323,747, filed on Dec. 30, 2005 now abandoned the disclosure of which is herein incorporated by reference. U.S. patent application Ser. No. 11/323,747 is (a) a continuation-in-part of U.S. patent application Ser. No. 10/518,886, filed Dec. 21, 2004 now abandoned, which is a National Stage Application of International Application No. PCT/US2003/016947, filed May 30, 2003, which claims the benefit of Provisional Application No. 60/396,497, filed Jul. 17, 2002; and (b) a continuation-in-part of Ser. No. 10/398,255, filed Apr. 3, 2003 now U.S. Pat. No. 7,425,591, which is a National Stage Application of International Application No. PCT/US2001/42767, filed Oct. 16, 2001, which claims the benefit of Provisional Application No. 60/294,808, filed May 31, 2001, and is a continuation-in-part of Ser. No. 09/691,764, filed Oct. 18, 2000, now U.S. Pat. No. 6,710,116; the disclosures of which are all incorporated herein by reference. This application is also a continuation in part of U.S. Ser. No. 11/791,885 filed May 29, 2007, which is a National Stage Application of International Application No. PCT/US05/35052, filed Sep. 30, 2005 (which claims priority to and the benefit of U.S. Ser. No. 60/639,939, filed Dec. 29, 2004).

This application is also related to U.S. Application Ser. No. 61/087,461, filed Aug. 8, 2008, herein incorporated by reference.

FIELD OF THE INVENTION

This invention relates to tire innerliners having improved cold temperature properties. More particularly, this invention relates to cured elastomeric compositions for use as tire innerliners that have improved cold temperature properties and comprise a hydrocarbon fluid additive.

BACKGROUND OF THE INVENTION

Elastomeric compositions are used in a wide variety of applications, including hoses, belts, footwear components, vibration isolation devices, tires, and tire components such as treads, sidewalls, and innerliners. The selection of ingredients for the commercial formulation of an elastomeric composition depends upon the balance of properties desired, the application, and the application's end use. For example, in the tire industry the balance between processing properties of the green (uncured) composition in the tire plant and in-service performance of the cured rubber tire composite is of particular importance. An additional consideration to be balanced is the nature of the tire, e.g., bias versus radial tire or passenger car tire versus truck tire versus aircraft tire. The ability to improve a tire's air impermeability properties and flex fatigue properties without affecting the processability of the uncured elastomeric composition or while maintaining or improving the physical property performance of the cured elastomeric composition is a goal that still remains.

Generally, the raw ingredients and materials used in tire compounding impact tire performance variables. Thus, any alternative to conventional ingredients must be compatible with the rubbers, not interfere with the vulcanization rate, be easily dispersed in all tire compounds, be cost effective, and not adversely impact tire performance. This is of particular concern for tire innerliners and tire innertubes where performance properties must be maintained within specified tolerance levels. For example, small increases in a tire innerliner compound's 300% modulus can lead to reduction in fatigue resistance and cracks with consequential loss in tire durability. Furthermore, for an elastomeric composition that acts as an air barrier it is of particular importance that any benefits in compound processability are not to the detriment of the composition's air retention capabilities.

Conventionally, halobutyl rubbers have been used to obtain better air-retention in tires. While halobutyl rubber has allowed for improvement in a composition's air-retention qualities, it can negatively effect the composition's flex fatigue and brittleness properties. This is of particular concern for certain tire applications which require improved heat resistance and improved cold temperature properties, such as is required for race-car tires, snow tires, and aircraft tires. In order to improve flex fatigue and brittleness properties, secondary elastomers, such as ethylene-propylene rubber ("EP"), ethylene-propylene-diene rubber ("EPDM"), or natural rubber, have been blended with butyl rubbers in tire innerliner/innertube compounds. While these secondary elastomers may help improve flex fatigue and brittleness temperatures, the blending of EP, EPDM, or natural rubbers often increases the air permeability of the elastomeric composition.

Thus, there is still a need for an elastomeric composition that is suitable for a tire innerliner or tire innertube that will have enhanced thermal stability and physical properties under severe temperature and operating conditions such as required for race car tires and aircraft tires. It would be advantageous to have an elastomeric composition that possesses improved low-temperature toughness without sacrificing other advantageous traits such as improved processability and air-impermeability.

SUMMARY OF THE INVENTION

The present disclosure provides an elastomeric composition, such as a tire innerliner, comprising at least one isobutylene based elastomer and at least one hydrocarbon fluid additive ("HFA"). The compositions are useful in a variety of applications and are particularly suitable for an air barrier such as a tire innertube or innerliner. In some embodiments, the composition provides improved cold temperature properties and is particularly useful as a tire innerliner for an aircraft tire.

In one aspect this disclosure relates to a cured elastomeric composition for use in a tire innerliner, comprising (i) from 50 to 100 phr of at least one isobutylene-based elastomer; (ii) less than or equal to 50 phr, or less than or equal to 10 phr, of natural rubber; and (iii) from 1 to 30 phr of at least one HFA. The cured elastomeric composition preferably has a MOCON permeability coefficient of less than or equal to T, where $T=-0.1147Y+0.54$ where Y is the change in brittleness determined by subtracting the brittleness in ° C. of the cured elastomeric composition containing HFA from the brittleness in ° C. of a cured composition having the same components except that it contains a naphthenic oil having a flash point in the range of 160 to 170° C., a pour point of about $-40°$ C.$\pm 5\%$, and a specific gravity at 15.6° C. of about 0.91±0.01 instead of the HFA.

In another aspect this disclosure relates to a cured elastomeric composition for use in a tire innerliner, comprising (i) from 50 to 90 phr, or from 70 to 90 phr, of at least one isobutylene-based elastomer; (ii) from 1 to 50 phr, or from 10 to 30 phr, or from 15 to 30 phr, of natural rubber; and (iii) from 1 to 30 phr, or from 4 to 30 phr, of at least one HFA. The cured elastomeric composition preferably has a MOCON permeability coefficient of less than or equal to Z, where $Z=0.282X+0.4817$ where X is the amount of natural rubber in phr. The cured elastomeric composition preferably has a brittleness of less than or equal to A, where $A=-0.13X-51$ where X is the amount of natural rubber in phr.

In yet another aspect this disclosure relates to a process for producing an air barrier comprising the steps of (i) combining from 50 to 90 phr of at least one isobutylene-based elastomer, from 1 to 50 phr (or from 10 to 50 phr) of natural rubber, and from 1 to 30 phr (or from 4 to 30 phr) of at least one HFA; (ii) curing the combined components to form a cured elastomeric composition wherein the cured elastomeric composition has a MOCON permeability coefficient of less than or equal to Z, where $Z=0.282X+0.4817$ where X is the amount of natural rubber in phr and a brittleness of less than or equal to A, where $A=-0.13X-51$ where X is the amount of natural rubber in phr; and (iii) shaping the cured elastomeric composition to form the air barrier.

In one embodiment, and in combination with any of the above disclosed aspects or embodiments, the isobutylene-based elastomer is selected from the group consisting of butyl rubber, halogenated butyl rubber, star-branched butyl rubber, halogenated star-branched butyl rubber, poly(isobutylene-co-p-methylstyrene), halogenated poly(isobutylene-co-p-methylstyrene), and mixtures thereof.

In another embodiment, and in combination with any of the above disclosed aspects or embodiments, the HFA has a flash point of at least 200° C., a pour point of less than or equal to −15° C., and a specific gravity at 15.6° C. of less than or equal to 0.880.

In one embodiment and in combination with any of the above disclosed aspects or embodiments, the hydrocarbon fluid additive is selected from a group consisting of polyalphaolefins, high purity hydrocarbon fluids, water white group III mineral oils, and blends thereof.

In one embodiment and in combination with any of the above disclosed aspects or embodiments, the HFA is a polyalphaolefin and has a Kinematic viscosity at 100° C. of at least 4 cSt, or in the range of 6 to 40 cSt. The polyalphaolefin may also have a viscosity index of at least 120.

In some embodiments, and in combination with any of the above disclosed aspects or embodiments, the elastomeric composition is substantially free of naphthenic oil and/or is substantially free of aromatic oil.

In other embodiments, and in combination with any of the above disclosed aspects or embodiments, the elastomeric composition further comprises one or more filler components selected from calcium carbonate, mica, silica, silicates, talc, titanium dioxide, starch, wood flour, carbon black, and mixtures thereof.

These and other objects, features, and advantages will become apparent as reference is made to the following detailed description, preferred embodiments, examples, and appended claims.

DETAILED DESCRIPTION OF THE INVENTION

Figure 1:
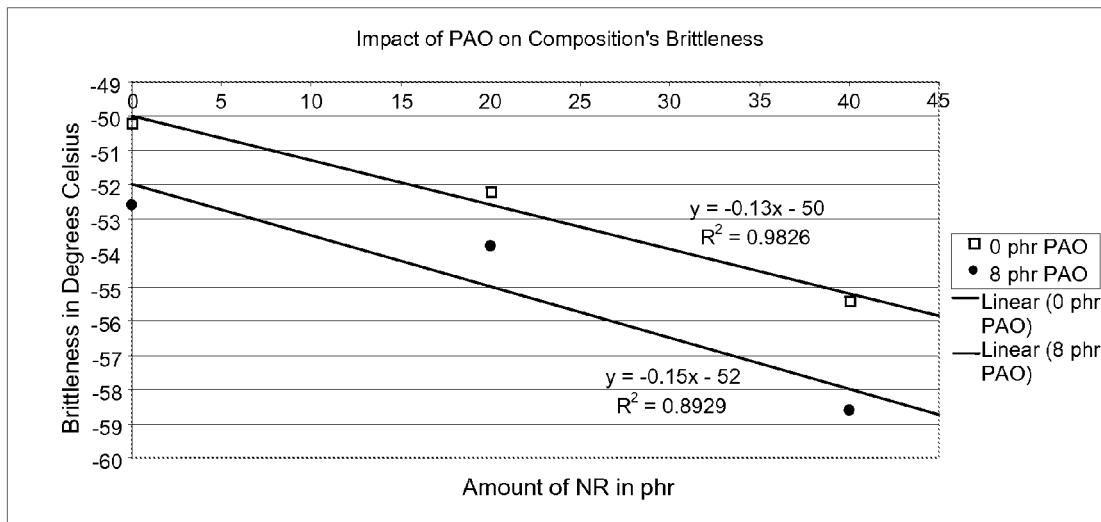
FIG. 1 is a graph illustrating the impact on an elastomeric composition's brittleness when the composition contains polyalphaolefin ("PAO") and varying amounts of natural rubber.

Various specific embodiments, versions, and examples are described herein, including exemplary embodiments and definitions that are adopted for purposes of understanding the claimed invention. While the following detailed description gives specific preferred embodiments, those skilled in the art will appreciate that these embodiments are exemplary only, and that the invention can be practiced in other ways. For purposes of determining infringement, the scope of the invention will refer to any one or more of the appended claims, including their equivalents, and elements or limitations that are equivalent to those that are recited. Any reference to the "invention" may refer to one or more, but not necessarily all, of the inventions defined by the claims.

The term "phr" means parts per hundred parts of rubber, and is a measure common in the art wherein components of a composition are measured relative to the total of all of the elastomer (rubber) components. The total phr or parts for all rubber components, whether one, two, three, or more different rubber components is present in a given recipe is defined as 100 phr. All other non-rubber components are ratioed against the 100 parts of rubber and are expressed in phr.

The term "elastomer," as used herein, refers to any polymer or combination of polymers consistent with the ASTM D1566 definition of "a material that is capable of recovering from large deformations, and can be, or already is, modified to a state in which it is essentially insoluble (but can swell) in boiling solvent." As used herein, the term "elastomer" may be used interchangeably with the term "rubber." Preferred elastomers have a melting point that cannot be measured by DSC or if it can be measured by DSC is less than 40° C., or preferably less than 20° C., or less than 0° C. Preferred elastomers have a Tg of −50° C. or less as measured by DSC.

As used herein, the term "isobutylene based elastomer," refers to an elastomer or polymer comprising at least 70 mol % repeat units from isobutylene.

The elastomeric compositions of the invention comprise isobutylene based elastomers, hydrocarbon fluid additives ("HFA"), and may further comprise various other fillers and additives. In one embodiment, the HFA is used in addition to other conventional processing aids or oils. However, in other embodiments, the HFA may be able to partially or fully replace conventional processing aids and/or oil, while maintaining current tire performance parameters within an acceptable range. For example, the use of HFA in place of aromatic process oils may allow for optimization of the tire innerliners impermeability and brittleness properties. Alternatively, the HFA may be blended with a naphthenic or paraffinic process oil to maintain tire performance parameters equivalent to those compositions containing only aromatic oil.

A thermal gravimetric analyzer with headspace gas chromatography may be used to analyze the content and composition of oil additives in the elastomeric composition. The amount of HFA in the elastomeric composition may be determined as described in Paragraphs [0623] to [0630] in U.S. Patent Application Publication No. 2008/0045638, herein incorporated by reference.

In one embodiment, the elastomeric composition is substantially free of naphthenic oil. Substantially free of naphthenic oils is defined to mean that naphthenic oil has not deliberately been added to the elastomeric composition, or, in the alternative, if present the elastomeric composition comprises less than 2 phr of naphthenic oil, or less than 0.5 phr, or more preferably less than 0.25 phr, or most preferably less than 0.1 phr of naphthenic oil. In one embodiment, naphthenic oil is present at 0 phr. Naphthenic oils are typically heavy hydrogenated oils having greater than 40% of the carbons in naphthenic structures (i.e., saturated rings) and less than 20% of the carbons in aromatic structures (i.e., unsaturated rings). Some naphthenic oils have about 40-55% of the carbons in paraffinic chain-like structures (i.e., isoparaffinic and normal paraffinic), 40-55% of the carbons in naphthenic structures, and 6-15% of the carbons in aromatic structures. As used herein, for the purpose of comparing an elastomeric structure containing HFA to another composition having the same components except that it contains a naphthenic oil instead of the HFA, the naphthenic oil has a flash point in the range of 160 to 170° C., a pour point of about −40° C.±5%, and a specific gravity at 15.6° C. of about 0.91±0.01.

In another embodiment, the elastomeric composition is substantially free of aromatic oil. Substantially free of aromatic oil is defined to mean that aromatic oil has not deliberately been added to the elastomeric composition, or, in the alternative, if present the elastomeric composition comprises less than 2 phr of aromatic oil, or less than 0.5 phr, or more preferably less than 0.25 phr, or most preferably less than 0.1 phr. In one embodiment, aromatic oil is present at 0 phr. Generally, aromatic oils are compounds containing at least 35% by mass of single- and multiple-ring components. Generally, aromatic oils contain unsaturated polycyclic components. Some aromatic oils have about 35-55% of the carbons in paraffinic chain-like structures (i.e., isoparaffinic and normal paraffinic), 10-35% of the carbons in naphthenic structures (i.e., saturated rings), and 30-40% of the carbons in aromatic structures (i.e., unsaturated rings).

In yet another embodiment, the elastomeric composition is substantially free of paraffinic oil. Substantially free of paraffinic oil is defined to mean that paraffinic oil has not deliberately been added to the elastomeric composition, or, in the alternative, if present the elastomeric composition comprises less than 2 phr of paraffinic oil, or less than 0.5 phr, or more preferably less than 0.25 phr, or most preferably less than 0.1 phr. In one embodiment, paraffinic oil is present at 0 phr. Generally, paraffinic oils have greater than 60% of the carbons in paraffinic chain-like structures (i.e., isoparaffinic and normal paraffinic), and less than 40% of the carbons in naphthenic structures (i.e., saturated rings), and less than 20% of the carbons in aromatic structures (i.e., unsaturated rings). Some paraffinic oils have about 60-80% of the carbons in paraffinic chain-like structures, 20-40% of the carbons in naphthenic structures, and 0-10% of the carbons in aromatic structures.

In a further embodiment, the elastomeric composition is substantially free of polybutene processing oil. Substantially free of polybutene processing oil is defined to mean that polybutene processing oil has not deliberately been added to the elastomeric composition, or, in the alternative, if present the elastomeric composition comprises less than 2 phr of polybutene processing oil, or less than 0.5 phr, or more preferably less than 0.25 phr, or most preferably less than 0.1 phr. A polybutene processing oil comprises 50 mole % or more of butene polymers, and is a copolymer of at least isobutylene derived units, 1-butene derived units, and 2-butene derived units. The polybutene processing oil is preferably low molecular weight and has a number average molecular weight of 15,000 g/mol or less.

Elastomer

The elastomeric compositions described herein comprise at least one isobutylene-based elastomer. Typical isobutylene-based elastomers that may be included in the compositions are $C_4$ monoolefin based rubbers, such as butyl rubber (isoprene-isobutylene rubber, "IIR"), branched ("star-branched") butyl rubber, star-branched polyisobutylene rubber, bromobutyl ("BIIR"), chlorobutyl ("CIIR"), random copolymers of isobutylene and para-methylstyrene (poly(isobutylene-co-p-methylstyrene)), halogenated poly(isobutylene-co-p-methylstyrene) ("BIMSM"), any halogenated versions of these elastomers, and mixtures thereof. Useful elastomers can be made by any suitable means known in the art, and the invention is not herein limited by the method of producing the elastomer.

In some embodiments, the elastomeric composition comprises a blend of two or more elastomers. Blends of elastomers may be reactor blends and/or melt mixes. The individual elastomer components may be present in various conventional amounts, with the total elastomer content in the elastomeric composition being expressed in the formulation as 100 phr.

Useful elastomers include isobutylene-based homopolymers or copolymers. An isobutylene based elastomer refers to an elastomer or polymer comprising at least 70 mol % repeat units from isobutylene. These polymers can be described as random copolymers of a $C_4$ isomonoolefin derived unit, such as an isobutylene derived unit, and at least one other polymerizable unit. The isobutylene-based elastomer may or may not be halogenated.

The elastomer may also be a butyl-type rubber or branched butyl-type rubber, including halogenated versions of these elastomers. Useful elastomers are unsaturated butyl rubbers such as homopolymers and copolymers of olefins, isoolefins, and multiolefins. Non-limiting examples of other useful unsaturated elastomers are poly(isobutylene-co-isoprene), polyisobutylene, star-branched butyl rubber, halogenated and non-halogenated random copolymers of isobutylene and para-methylstyrene, and mixtures thereof.

The elastomer may or may not be halogenated. Preferred halogenated elastomers may be selected from the group consisting of halogenated butyl rubber, bromobutyl rubber, chlorobutyl rubber, halogenated branched ("star-branched") butyl rubbers, and halogenated random copolymers of isobutylene and para-methylstyrene. Halogenation can be carried out by any means, and the invention is not herein limited by the halogenation process.

Examples of suitable commercially available halogenated butyl rubbers include Bromobutyl 2222 and Bromobutyl 2225, both available from ExxonMobil Chemical Company. Bromobutyl 2222 has a Mooney viscosity from 27 to 37 (ML 1+8 at 125° C., ASTM D1646), and the bromine content is from 1.8 to 2.2 wt %. Further, cure characteristics of Bromobutyl 2222 are as follows: MH is from 28 to 40 dN·m, ML is from 7 to 18 dN·m (ASTM D2084).

In one embodiment, the elastomer may be a branched or "star-branched" butyl rubber ("SBB'). SBB is typically a composition of a butyl rubber, either halogenated or not, and a polydiene or block copolymer, either halogenated or not. In one embodiment, the SBB or halogenated-SBB is a composition of a butyl or halogenated butyl rubber and a copolymer of a polydiene and a partially hydrogenated polydiene selected from the group including styrene, polybutadiene, polyisoprene, polypiperylene, natural rubber, styrene-butadiene rubber, ethylene-propylene diene rubber (EPDM), ethylene-propylene rubber (EPR), styrene-butadiene-styrene, and styrene-isoprene-styrene block copolymers. These poly-dienes are present in one embodiment, based on the monomer wt %, greater than 0.3 wt %, or in another embodiment in the range of 0.3 to 3 wt %, or in the range of 0.4 to 2.7 wt %.

In one embodiment, the elastomer may be a random copolymer comprising a $C_4$ isomonoolefin, such as isobutylene, and an alkystyrene comonomer, such as para-methylstyrene, containing at least 80%, alternatively at least 90%, by weight of the para-isomer.

The copolymers may optionally include functionalized interpolymers wherein at least one or more of the alkyl substituent groups present in the styrene monomer units contain a halogen or some other functional group. In one embodiment, up to 60 mol % of the para-substituted styrene present in the random polymer structure may be functionalized. In another embodiment, the amount of functionalized para-methylstyrene is in the range of 0.1 to 5 mol %, or in the range of 0.2 to 3 mol %. The functional group may be halogen or some other functional group which may be incorporated by nucleophilic substitution of benzylic halogen with other groups such as carboxylic acids, carboxy salts, carboxy esters, amides and imides, hydroxyl, alkoxide, phenoxide, thiolate, thioether, xanthate, cyanide, cyanate, amino, and mixtures thereof. These functionalized isomonoolefin copolymers, their method of preparation, methods of functionalization, and cure are more particularly disclosed in U.S. Pat. No. 5,162,445, incorporated herein by reference.

In a further embodiment, the elastomer comprises random copolymers of isobutylene and para-methylstyrene containing from 0.5 to 20 mol % para-methylstyrene wherein up to 60 mol % of the methyl substituent groups present on the benzyl ring contain a bromine or chlorine atom, as well as acid or ester functionalized versions thereof. In certain embodiments, the random copolymers have a substantially homogeneous compositional distribution such that at least 95% by weight of the polymer has para-alkylstyrene content within 10% of the average para-alkylstyrene content of the polymer. Exemplary polymers are characterized by a narrow molecular weight distribution (Mw/Mn) of less than 5, alternatively less than 2.5, an exemplary viscosity average molecular weight in the range of 200,000 up to 2,000,000 and an exemplary number average molecular weight in the range of 25,000 to 750,000 as determined by gel permeation chromatography.

The elastomer may be a brominated poly(isobutylene-co-p-methylstyrene) ("BIMSM"). BIMSM polymers generally contain from 0.1 to 5% mole of bromomethylstyrene groups relative to the total amount of monomer derived units in the copolymer. In one embodiment, the amount of bromomethyl groups is in the range of 0.2 to 3.0 mol %, or in the range of 0.3 to 2.8 mol %, or in the range of 0.4 to 2.5 mol %, or in the range of 0.3 to 2.0 mol %, wherein a desirable range may be any combination of any upper limit with any lower limit. Expressed another way, exemplary copolymers may contain 0.2 to 10 wt % of bromine, based on the weight of the polymer, or 0.4 to 6 wt % bromine, or 0.6 to 5.6 wt %, in another embodiment they are substantially free of ring halogen or halogen in the polymer backbone chain. In one embodiment, the random polymer is a copolymer of $C_4$ to $C_7$ isoolefin derived units (or isomonoolefin), para-methylstyrene derived units, and para-(halomethylstyrene) derived units, wherein the para-(halomethylstyrene) units are present in the polymer in the range of 0.4 to 3.0 mol % based on the total number of para-methylstyrene, and wherein the para-methylstyrene derived units are present in the range of 3 to 15 wt %, or in the range of 4 to 10 wt %, based on the total weight of the polymer. In a preferred embodiment, the para-(halomethylstyrene) is para-(bromomethylstyrene).

Commercial embodiments of useful halogenated isobutylene-p-methylstyrene rubbers include EXXPRO™ elastomers, available from ExxonMobil Chemical Company, Houston, Tex., having a Mooney viscosity (ML 1+8 at 125° C., ASTM D1646) in the range of 30 to 50, a p-methylstyrene content in the range of 4 to 8.5 wt %, and a bromine content in the range of 0.7 to 2.2 wt % relative to the halogenated isobutylene-p-methylstyrene rubber.

In a preferred embodiment the elastomer is selected from poly(isobutylene-co-alkylstyrene), preferably poly(isobutylene-co-p-methylstyrene), halogenated poly(isobutylene-co-alkylstyrene), preferably halogenated poly(isobutylene-co-p-methylstyrene), star branched butyl rubber, halogenated star-branched butyl rubber, butyl rubber, halogenated butyl rubber, and mixtures thereof. In another preferred embodiment the elastomer comprises bromobutyl rubber or chlorobutyl rubber.

In another embodiment, the isobutylene-based elastomer in the composition may be a blend of two or more different isobutylene-based elastomers, alternately three or more, alternately four or more. By "different isobutylene based elastomer" is meant the isobutylene based elastomers differ in at least one of the following: a) comonomer type (e.g. isoprene vs. para-alkylstyrene); b) molecular weight (Mn as determined by GPC) by at least 10%; c) Mooney Viscosity (ML 1+8 at 125° C., ASTM D1646) by at least 10%; d) in comonomer content (by at least 10%; as determined by $C^{13}$ nuclear magnetic resonance or infrared spectroscopy); e) in halogen content by at least 1%; and/or f) in halogen type (e.g. Cl vs. Br). Alternately the b) and/or c) and/or d) differ by at least 20%, alternately by at least 30%. In another embodiment the halogen content varies by at least 2%, alternately by at least 3% alternately by at least 5%.

In other embodiments, the isobutylene based elastomer portion of the elastomeric composition comprises from 50 to 90 phr, or from 70 to 90 phr, of a first isobutylene-based elastomer and from 10 to 50 phr, or from 15 to 30 phr, of different isobutylene based elastomer(s).

Secondary Elastomer

The elastomeric composition may further include a secondary elastomer. A secondary elastomer may be used in combination with the at least one isobutylene-based elastomer to provide a balance of properties. For example, the elastomeric composition may comprise differing amounts of at least one isobutylene-based elastomer and a secondary elastomer to provide beneficial compound Mooney viscosity, Mooney scorch, curing characteristics, air impermeability, flex fatigue retention, and adhesion to adjacent components in a cured tire.

The secondary elastomer is generally a non isobutylene based rubber of types conventionally used in tire rubber compounding, herein referred to as "general purpose rubbers." A general purpose rubber may be any rubber that usually provides high strength and good abrasion along with low hysteresis and high resilience.

Examples of general purpose rubbers include natural rubbers ("NR"), polyisoprene rubber ("IR"), poly(styrene-co-butadiene) rubber ("SBR"), solution-styrene-butadiene rubber ("sSBR"), emulsion-styrene-butadiene rubber, nitrile rubber, polybutadiene rubber ("BR"), high cis-polybutadiene, polyisoprene rubber, poly(isoprene-co-butadiene) rubber ("IBR"), styrene-isoprene-butadiene rubber ("SIBR"), and mixtures thereof. Ethylene-propylene rubber ("EP") and ethylene-propylene-diene rubber ("EPDM"), and their mixtures, are also referred to as general purpose rubbers.

In one embodiment, the secondary elastomer is a general purpose rubber such as polybutadiene rubber ("BR"). Another useful general purpose rubber is high cis-polybutadiene ("cis-BR"). By "cis-polybutadiene" or "high cis-polybutadiene", it is meant that 1,4-cis polybutadiene is used, wherein the amount of cis component is at least 95%.

In yet another embodiment, the secondary elastomer may comprise rubbers of ethylene and propylene derived units such as EP and EPDM. Examples of suitable comonomers in making EPDM are ethylidene norbornene, 1,4-hexadiene, dicyclopentadiene, as well as others. In one embodiment, the secondary elastomer may comprise an ethylene/alpha-olefin/diene terpolymer. The alpha-olefin may be selected from the group consisting of $C_3$ to $C_{20}$ alpha-olefin with propylene, butene and octene being preferred and propylene most preferred. The diene component may be selected from the group consisting of $C_4$ to $C_{20}$ dienes.

In a preferred embodiment, the secondary elastomer is a natural rubber. Desirable natural rubbers may be selected from technically specified rubbers ("TSR"), such as Malaysian rubbers which include, but are not limited to, SMR CV, SMR 5, SMR 10, SMR 20, SMR 50, and mixtures thereof. Preferred natural rubbers have a Mooney viscosity at 100° C. (ML 1+4, ASTM D1646) in the range of 30 to 120, or in the range of 40 to 80.

In one embodiment, the elastomeric composition comprises 100 phr of an isobutylene-based elastomer. In another embodiment, the elastomeric composition comprises a blend of at least one isobutylene-based elastomer and a secondary elastomer which is a non-isobutylene based elastomer.

In some embodiments, the elastomeric composition comprises from 50 to 100 phr, or from 70 to 100 phr, or from 75 to 95 phr, of isobutylene-based elastomers, and less than or equal to 50 phr, or less than or equal to 30 phr, or less than or equal to 15 phr, or less than or equal to 10 phr of a secondary elastomer. In one embodiment, the elastomeric composition comprises from 90 to 100 phr of isobutylene based elastomers and less than or equal to 10 phr of a secondary elastomer. The secondary elastomer may be natural rubber.

In one embodiment, a secondary elastomer other than natural rubber is present; however no natural rubber is added to the elastomeric composition. In some embodiments the elastomeric composition comprises 0 phr of natural rubber.

In other embodiments, the elastomeric composition comprises from 50 to 90 phr or from 70 to 90 phr of isobutylene-based elastomers and from 10 to 50 phr or from 15 to 30 phr of a secondary elastomer. The secondary elastomer may be natural rubber.

The elastomers and/or secondary elastomers may be blended with various other rubbers or plastics, in particular thermoplastic resins such as nylons or polyolefins such as polypropylene or copolymers of polypropylene. These compositions are useful in air barriers such as bladders, tire innertubes, tire innerliners, air sleeves (such as in air shocks), diaphragms, as well as other applications where high air or oxygen retention is desirable.

Hydrocarbon Fluid Additive

The elastomeric compositions described herein include at least one hydrocarbon fluid additive ("HFA"). The classes of materials described herein that are useful as HFAs can be utilized alone or admixed with other HFAs described herein to obtain desired properties. Any HFA useful in the present invention may also be described by any number of, or any combination of, parameters described herein.

In one embodiment, the HFA is defined to be a hydrocarbon liquid compound comprising carbon and hydrogen, having functional groups selected from hydroxide, aryls, substituted aryls, halogens, alkoxys, carboxylates, esters, carbon unsaturation, acrylates, oxygen, nitrogen, and carboxyl present to an unappreciable extent. By "unappreciable extent", it is meant that these groups and compounds comprising these groups are not deliberately added to the HFA, and if present at all for any reason, are present at less than 5 wt %, or less than 3 wt %, or preferably less than 1 wt %, or less than 0.5 wt %, or less than 0.1 wt %, or less than 0.05 wt %, or less than 0.01 wt %, or less than 0.001 wt %, based upon the weight of the HFA.

In some embodiment, aromatic moieties (including compounds whose molecules have the ring structure characteristic of benzene, naphthalene, phenanthrene, anthracene, etc.) are substantially absent from the HFA. In yet another embodiment, naphthenic moieties (including compounds whose molecules have a saturated ring structure such as would be produced by hydrogenating benzene, naphthalene, phenanthrene, anthracene, etc.) are substantially absent from the HFA. By "substantially absent", it is meant that the aromatic moieties or the naphthenic moieties are not deliberately added to the HFA, and if present at all for any reason, are present at less than 5 wt %. Preferably, these groups and compounds are present at less than 4 wt %, or less than 3 wt %, or less than 2 wt %, or less than 1 wt %, or less than 0.7 wt %, or less than 0.5 wt %, or less than 0.3 wt %, or less than 0.1 wt %, or less than 0.05 wt %, or less than 0.01 wt %, or less than 0.001 wt %, based upon the weight of the HFA.

In some embodiments, the HFA is a hydrocarbon that contains olefinic unsaturation to an unappreciable extent. By "unappreciable extent of olefinic unsaturation", it is meant that the carbons involved in olefinic bonds account for less than 10%, or less than 6%, or less than 2%, or preferably less than 1%, or less than 0.5%, or less than 0.1%, or less than 0.05%, or less than 0.01%, or less than 0.001%, of the total number of carbons. In some embodiments, the percent of carbons of the HFA involved in olefinic bonds is in the range of 0.001 to 10%, or in the range of 0.01 to 5%, or in the range of 0.1 to 2%, of the total number of carbon atoms in the HFA.

Particularly preferred HFAs include a) polyalphaolefins, b) high purity hydrocarbon fluids derived from a so-called Gas-To-Liquids processes, and c) Group III Mineral Oils; with a viscosity index greater than 100 (preferably greater than 120), a pour point less than −15° C. (preferably less than −20° C.), a specific gravity less than 0.88 (preferably less than 0.86), and a flash point greater than 200° C. (preferably greater than 230° C.).

In preferred embodiments, the HFA has a kinematic viscosity at 100° C. ($KV_{100}$) of 3 cSt or more, preferably 4 cSt or more, preferably 5 cSt or more, preferably 6 cSt or more, preferably 8 cSt or more, preferably 10 cSt or more, preferably 20 cSt or more, preferably 40 cSt or more, preferably 6 to 5000 cSt, preferably 8 to 3000 cSt, preferably 10 to 1000 cSt, preferably 12 to 500 cSt, preferably 15 to 400 cSt, preferably 20 to 350 cSt, preferably 35 to 300 cSt, preferably 40 to 200 cSt, preferably 8 to 300 cSt, preferably 6 to 150 cSt, preferably 10 to 100 cSt, preferably less than 50 cSt, wherein a desirable range may be any combination of any lower $KV_{100}$ limit with any upper $KV_{100}$ limit described herein.

In preferred embodiments, the HFA has a pour point of −10° C. or less, preferably −20° C. or less, preferably −30° C. or less, preferably −40° C. or less, preferably −45° C. or less, preferably −50° C. or less, preferably −10 to −100° C., preferably −15 to −80° C., preferably −15 to −75° C., preferably −20 to −70° C., preferably −25 to −65° C., preferably greater than −120° C., wherein a desirable range may be any combination of any lower pour point limit with any upper pour point limit described herein.

In another embodiment, the HFA has a pour point of less than −30° C. when the kinematic viscosity at 40° C. is from 20 to 600 cSt (preferably 30 to 400 cSt, preferably 40 to 300 cSt). Most mineral oils, which typically include aromatic moieties and other functional groups, have a pour point of from 10 to −20° C. in the same kinematic viscosity range.

In a preferred embodiment, the HFA has a glass transition temperature ($T_g$) of −40° C. or less, preferably −50° C. or less, preferably −60° C. or less, preferably −70° C. or less, preferably −80° C. or less, preferably −45 to −120° C., preferably −65 to −90° C., wherein a desirable range may be any combination of any lower $T_g$ limit with any upper $T_g$ limit described herein.

In preferred embodiments, the HFA has a Viscosity Index (VI) of 100 or more, preferably 110 or more, preferably 120 or more, preferably 130 or more, preferably 115 to 350, preferably 135 to 300, preferably 140 to 250, preferably 150 to 200, preferably 125 to 180, wherein a desirable range may be any combination of any lower VI limit with any upper VI limit described herein.

In preferred embodiments, the HFA has a flash point of 200° C. or greater, preferably 210° or greater, preferably 230° C. or greater, preferably 200 to 320° C., preferably 210 to 300° C., preferably 215 to 290° C., preferably 220 to 280° C., preferably 240 to 280° C., wherein a desirable range may be any combination of any lower flash point limit with any upper flash point limit described herein.

In preferred embodiments, the HFA has a specific gravity of 0.88 or less, or 0.86 or less, preferably 0.855 or less, preferably 0.84 or less, preferably 0.78 to 0.86, preferably 0.79 to 0.855, preferably 0.80 to 0.85, preferably 0.81 to 0.845, preferably 0.82 to 0.84, wherein a desirable range may be any combination of any lower specific gravity limit with any upper specific gravity limit described herein.

In preferred embodiments, the HFA has a low degree of color, such as typically identified as "water white", "prime white", "standard white", or "bright and clear," preferably an APHA color of 100 or less (preferably 80 or less, preferably 60 or less, preferably 40 or less, preferably 20 or less).

In other embodiments, any HFA may have an initial boiling point of from 300 to 600° C. (preferably 350 to 500° C., preferably greater than 400° C.).

Any of the HFAs for use in the present invention may be described by any embodiment described herein or any combination of the embodiments described herein.

In some embodiments, the HFA described herein has a flash point of 200° C. or more (preferably 210° C. or more, or 220° C. or more, or 230° C. or more) and a pour point of −15° C. or less (or −20° C. or less, or preferably −25° C. or less, preferably −30° C. or less, preferably −35° C. or less, preferably −45° C. or less, preferably −50° C. or less).

In certain embodiments, the HFA has a) a specific gravity of 0.86 or less (preferably 0.855 or less, preferably 0.85 or less); b) a VI of 120 or more (preferably 135 or more, preferably 140 or more); and c) a flash point of 200° C. or more (preferably 220° C. or more, preferably 240° C. or more).

In certain embodiments, the HFA has a) a flash point of 200° C. or more; b) a specific gravity of 0.88, or 0.86 or less; c) a pour point of −15° C. or less; and d) a viscosity index of 120 or more.

In another embodiment, the HFA has a pour point of −20° C. or less, preferably −30° C. or less, and one or more of the following properties:

i. a kinematic viscosity at 100° C. of 3 cSt or greater (preferably 6 cSt or greater, preferably 8 cSt or greater, preferably 10 cSt or more); and/or, ii. a Viscosity Index of 120 or greater (preferably 130 or greater); and/or, iii. a low degree of color, such as typically identified as "water white", "prime white", "standard white", or "bright and clear," preferably APHA color of 100 or less (preferably 80 or less, preferably 60 or less, preferably 40 or less, preferably 20 or less, preferably 15 or less); and/or iv. a flash point of 200° C. or more (preferably 220° C. or more, preferably 240° C. or more); and/or v. a specific gravity (15.6° C.) of less than 0.86.

Most mineral oils have a kinematic viscosity at 100° C. of less than 6 cSt, or an APHA color of greater than 20, or a flash point less than 200° C. when their pour point is less than −20° C.

In certain embodiments, the HFA has a pour point of −15° C. or less (preferably −15° C. or less, preferably −20° C. or less, preferably −25° C. or less), a VI of 120 or more (preferably 135 or more, preferably 140 or more), and optionally a flash point of 200° C. or more (preferably 220° C. or more, preferably 240° C. or more).

In certain embodiments, the HFA has a pour point of −20° C. or less (preferably −25° C. or less, preferably −30° C. or less, preferably −40° C. or less) and one or more of the following:

i. a flash point of 200° C. or more (preferably 220° C. or more, preferably 240° C. or more), and/or ii. a VI of 120 or more (preferably 135 or more, preferably 140 or more), and/or iii. a KV100 of 4 cSt or more (preferably 6 cSt or more, preferably 8 cSt or more, preferably 10 cSt or more), and/or iv. a specific gravity of 0.86 or less (preferably 0.855 or less, preferably 0.85 or less).

In certain embodiments, the HFA has a KV100 of 4 cSt or more (preferably 5 cSt or more, preferably 6 cSt or more, preferably 8 cSt or more, preferably 10 cSt or more), a specific gravity of 0.86 or less (preferably 0.855 or less, preferably 0.85 or less), and a flash point of 200° C. or more (preferably 220° C. or more, preferably 240° C. or more).

In a embodiment, the HFA has a flash point of 200° C. or more (preferably 220° C. or more, preferably 240° C. or more), a pour point of −10° C. or less (preferably −15° C. or less, preferably −20° C. or less, preferably −25° C. or less), a specific gravity of 0.86 or less (preferably 0.855 or less, preferably 0.85 or less), a KV100 of 4 cSt or more (preferably 5 cSt or more, preferably 6 cSt or more, preferably 8 cSt or more, preferably 10 cSt or more), and optionally a VI of 100 or more (preferably 120 or more, preferably 135 or more).

In a embodiment, the HFA has a flash point of 200° C. or more (preferably 210° C. or more, preferably 220° C. or more), a pour point of −10° C. or less (preferably −20° C. or less, preferably −30° C. or less), and a KV100 of 6 cSt or more (preferably 8 cSt or more, preferably 10 cSt or more, preferably 15 cSt or more).

In certain embodiments, the HFA has a pour point of −20° C. or less (preferably −25° C. or less, preferably −30° C. or less, preferably −40° C. or less) and one or more of the following:

i. a flash point of 200° C. or more (preferably 220° C. or more, preferably 240° C. or more), and/or ii. a VI of 120 or more (preferably 135 or more, preferably 140 or more), and/or iii. a KV100 of 4 cSt or more (preferably 6 cSt or more, preferably 8 cSt or more, preferably 10 cSt or more), and/or iv. a specific gravity of 0.86 or less (preferably 0.855 or less, preferably 0.85 or less).

In a embodiment, the HFA has a KV100 of 35 cSt or more (preferably 40 or more) and a specific gravity of 0.86 or less (preferably 0.855 or less), and optionally one or more of the following:

a) a flash point of 200° C. or more (preferably 220° C. or more, preferably 240° C. or more), and/or b) a pour point of −10° C. or less (preferably −15° C. or less, preferably −20° C. or less, preferably −25° C. or less).

In a preferred embodiment, the percentage of carbons in chain-type paraffins ($C_P$) for any HFA is at least 80% (preferably at least 85%, preferably at least 90%, even preferably at least 95%, even preferably at least 98%, most preferably at least 99%). Chain-type paraffins ($C_P$) are determined as described in US 2008/0045638.

Polyalphaolefin

In preferred embodiments, the HFA is a polyalphaolefin ("PAO"). In general, PAOs are oligomers of α-olefins (also known as 1-olefins) having a VI of 120 or more and are often used as the base stock for synthetic lubricants. PAOs are typically produced by the polymerization of alpha-olefins typically ranging from 1-octene to 1-dodecene, with 1-decene being a preferred material, although polymers of lower olefins such as ethylene and propylene may also be used, including copolymers of ethylene with higher olefins. The various grades of PAOs are mainly distinguished by their molecular weight or by their kinematic viscosity measured in centistokes (cSt) at 100° C. PAOs are Group 4 compounds, as defined by the American Petroleum Institute (API). Useful PAOs are described in, for example, U.S. Pat. No. 3,149,178; U.S. Pat. No. 4,827,064; U.S. Pat. No. 4,827,073; U.S. Pat. No. 5,171,908; and U.S. Pat. No. 5,783,531 and in SYNTHETIC LUBRICANTS AND HIGH-PERFORMANCE FUNCTIONAL FLUIDS, Leslie R. Rudnick & Ronald L. Shubkin, eds. (Marcel Dekker, 1999), p. 3-62.

A PAO is not a polymer. (A polymer is defined to be 75 mer units or more).

Useful PAOs may be made by any suitable means known in the art, and the invention is not herein limited by the method of producing the PAO. In one embodiment, the PAOs may be produced by the oligomerization or polymerization of alpha-olefins in the presence of a Friedel-Crafts (Lewis acid) catalyst, such as, for example, $AlCl_3$, $BF_3$, or a coordination complex such as ethylaluminum sesquichloride+$TiCl_4$. Alternatively, the PAO may be produced using a single-site coordination catalyst, such as a metallocene catalyst or a constrained geometry catalyst.

Subsequent to the polymerization, the PAO may be hydrogenated in order to reduce any residual unsaturation. Preferred PAOs are hydrogenated to yield substantially (>99 wt %) paraffinic materials. The PAOs may also be functionalized to comprise, for example, esters, polyethers, polyalkylene glycols, and the like.

The PAOs are preferably oligomers (e.g., are dimers, trimers, tetramers, pentamers, etc.) of $C_4$ to $C_{24}$ α-olefins, $C_6$ to $C_{12}$ α-olefins, and/or $C_8$ to $C_{12}$ α-olefins. Suitable olefins include 1-butene, 1-pentene, 1-hexene, 1-heptene, 1-octene, 1-nonene, 1-decene, 1-undecene, 1-dodecene, 1-tetradecene, and 1-hexadecene.

In one embodiment, the PAO comprises oligomers of a single alpha-olefin species having a carbon number of 5 to 24 (preferably 6 to 18, preferably 8 to 12, most preferably 10). In another embodiment, the PAO comprises oligomers of mixed alpha-olefins (i.e., involving two or more alpha-olefin species), each alpha-olefin having a carbon number of 3 to 24 (preferably 5 to 24, preferably 6 to 18, most preferably 8 to 12, or 8 to 14, or 8 to 16), provided that alpha-olefins having a carbon number of 3 or 4 are present at 10 wt % or less. In a preferred embodiment, the PAO comprises oligomers of mixed alpha-olefins (i.e., involving two or more alpha-olefin species) where the weighted average carbon number for the alpha-olefin mixture is 6 to 14 (preferably 8 to 12, preferably 9 to 11).

In one embodiment, at least one of the alpha-olefins is a linear alpha-olefin (LAO); more preferably, all the alpha-olefins are LAOs. Preferred PAO's comprise linear alpha olefins having 5 to 18 carbon atoms, preferably 6 to 12 carbon atoms, more preferably 8 to 12 carbon atoms, still more preferably an average of about 10 carbon atoms. Suitable LAOs include ethylene, propylene, 1-butene, 1-pentene, 1-hexene, 1-heptene, 1-octene, 1-nonene, 1-decene, 1-undecene, 1-dodecene, 1-tridecene, 1-tetradecene, 1-pentadecene, 1-hexadecene, and blends thereof. Preferably, $C_2$, $C_3$, and $C_4$ alpha-olefins (i.e., ethylene, propylene and 1-butene and/or isobutylene) are present in the PAO oligomers at an average concentration of 30 wt % or less, or 20 wt % or less, or 10 wt % or less, or 5 wt % or less; more preferably, $C_2$, $C_3$, and $C_4$ alpha-olefins are not present in the PAO oligomers.

In one or more embodiments, the PAO comprises oligomers of two or more $C_2$ to $C_{24}$, or $C_3$ to $C_{20}$ LAOs, to make 'bipolymer' or 'terpolymer' or higher-order copolymer combinations. Other embodiments involve oligomerization of a mixture of LAOs selected from $C_6$ to $C_{18}$ LAOs with even carbon numbers, preferably a mixture of two or three LAOs selected from 1-hexene, 1-octene, 1-decene, 1-dodecene, 1-tetradecene, and 1-hexadecene.

In general, PAOs are high purity hydrocarbons with a fully paraffinic structure and a high-degree of side-chain branching. The PAO may have irregular branching or regular branching. The PAO may comprise oligomers or low molecular weight polymers of branched and/or linear alpha olefins. Preferred PAOs have a "branching ratio," as defined in U.S. Pat. No. 4,827,064 and measured according to the method described therein, of 0.20 or less, or 0.18 or less, or 0.15 or less, or 0.10 or less.

The PAO may be a blend or mixture of one or more distinct PAOs with different compositions and/or different physical properties (e.g., kinematic viscosity, pour point, and/or viscosity index).

The PAO or blend of PAOs may have a kinematic viscosity ("KV") at 100° C. (as measured by ASTM D445 at 100° C.) (1 cSt=1 mm²/s) of 3 cSt or more, or 4 cSt or more, or 5 cSt or more, or 6 cSt or more, or 8 cSt or more, or 10 cSt or more, or 20 cSt or more, or 30 cSt or more, or 40 cSt or more, or 80 cSt or more, or 100 cSt or more, or 150 cSt or more, or 200 cSt or more, or 300 cSt or more, or 500 cSt or more, or 750 or more, or 1000 cSt or more. In some embodiments, the PAO has a KV at 100° C. in the range of 3 to 3,000 cSt, or 4 to 1,000 cSt, preferably 4 to 300 cSt, or 5 to 150 cSt, or 6 to 100 cSt, or 6 to 40 cSt. In other embodiments, the PAO or blend of PAOs has a KV100° C. in the range of 3 cSt to 20 cSt, or in the range of 5 cSt to 15 cSt, or preferably in the range of 6 cSt to 10 cSt. In further embodiments, the PAO or blend of PAOs has a KV100° C. in the range of 40 to 200 cSt, or in the range of 60 to 150 cSt, or preferably 80 cSt to 120 cSt.

The PAO or blend of PAO may have a viscosity index ("VI"), as determined by ASTM D-2270, of 100 or more, or 110 or more, or 120 or more, or 130 or more, or 140 or more, or 150 or more, or 170 or more, or 200 or more, or 250 or more, or 300 or more. Preferred PAOs have a VI in the range of 90 to 400, or in the range of 100 to 350, or 120 to 250, or 130 to 180, or in other embodiments in the range of 110 to 150 or 120 to 140.

PAOs with KV at 100° C. of 10 cSt or less generally have a VI of less than 150. A PAO with a high VI can be advantageous as a higher VI may indicate that the PAO has a higher viscosity at higher temperatures where polymer processing takes place such as, 200° C. or more; therefore, blending the PAO into the polymer may be facilitated (it is well known that homogeneous mixing of materials with severely mismatched viscosities such as a high viscosity polymer and a low viscosity fluid is difficult). On the other hand, for a given viscosity at high temperature (e.g., 200° C.), a higher VI means the PAO has a lower viscosity at room temperature, so the PAO is easier to pump. In certain embodiments, the PAO or blend of PAOs has a KV100° C. of 10 cSt or less and a VI of 150 or more. In other embodiments, the PAO or blend of PAOs has a KV100° C. of 150 cSt or less, preferably between 10 and 150 cSt, and a VI of greater than $105(KV100°\ C.)^{0.13}$ where KV100° C. is measured in cSt.

Useful PAOs typically possess a number average molecular weight (Mn) in the range of 100 to 21,000 g/mole, or 300 to 15,000, or 200 to 10,000, or 200 to 7,000, or 600 to 3,000, or in other embodiments in the range of 200 to 2,000 g/mole or 200 to 500 g/mole.

Useful PAOs have a weight average molecular weight (Mw) of less than 20,000 g/mole, or less than 10,000 g/mole, or less than 5,000 g/mole, or more preferably less than 4,000 g/mole, or less than 2,000 g/mole, or less than 500 g/mole. In some embodiments, the PAO may have an Mw of 1000 g/mole or more, or 2000 g/mole or more, or 2500 g/mole or more, or 3000 g/mole or more, or 3500 g/mole or more. In other embodiments the PAO may have an Mw in the range of 100 to 20,000 g/mole, or 200 to 10,000 g/mole, or 200 to 7,000 g/mole, or in the range of 2000 g/mole to 4000 g/mole, or in the range of 2500 g/mole to 3500 g/mole.

In one or more embodiments, the PAO or blend of PAOs has a molecular weight distribution as characterized by the ratio of the weight- and number-averaged molecular weights ($M_w/M_n$) of 4 or less, or 3 or less, or 2.5 or less, or 2.3 or less, or 2.1 or less, or 2.0 or less, or 1.9 or less, or 1.8 or less. In other embodiments, the PAO or blend of PAOs has an $M_w/M_n$ in the range of 1 to 2.5, preferably 1.1 to 2.3, or 1.1 to 2.1, or 1.1 to 1.9.

Preferably the PAO has a pour point, as determined by ASTM D97, of less than −15° C. or less, more preferably −20° C. or less, or −30° C. or less, or −40° C. or less, or −50° C. or less; or in some embodiments in the range of −20 to −80° C., or −30 to −70° C., or −15 to −70° C., or −25 to −60° C.

The PAO may have a dielectric constant, as measured by ASTM D 924, at 20° C. of less than 3.0, or less than 2.8, or less than 2.5, or less than 2.3, or less than 2.1.

Useful PAOs may have a specific gravity (ASTM D 4052, 15.6° C.) of less than 0.880, or less than 0.86, or less than 0.855, or less than 0.85, or more preferably in the range of 0.650 to 0.880, or 0.700 to 0.860, or 0.750 to 0.855, or 0.790 to 0.850, or 0.800 to 0.840.

Particularly preferred PAO's for use herein are those having a flash point as measured by the open cup method (ASTM-D92) of 200° C. or more, or 220° C. or more, or 230° C. or more, or 250° C. or more. In some embodiments, the PAO may have a flash point in the range of about 200 to 300° C., or in the range of about 210 to 275° C., or in the range of about 220 to 250° C.

In one or more embodiments, the PAO or blend of PAOs has a glass transition temperature ($T_g$) of −40° C. or less, or −50° C. or less, or −60° C. or less, or −70° C. or less, or −80° C. or less, preferably in the range of −50 to −120° C., or in some embodiments in the range of 60 to −100° C. or −70 to −90° C.

Useful PAOs or blends of PAOs may have one or more of the above described properties. For example, in one embodiment, the PAO comprises $C_6$ to $C_{14}$ olefins having a kinematic viscosity of 10 cSt or more at 100° C., and a viscosity index of 120 or more, or 130 or more.

In another embodiment, a useful PAO is one having a flash point of 200° C. or more (preferably 220° C. or more, or 230° C. or more, or 250° C. or more) and a pour point less than −25° C. (preferably less than −30° C., or less than −35° C., or less than −40° C.).

In a further embodiment, an advantageous PAO or blend of PAOs are those having i) a flash point of 200° C. or more, preferably 210° C. or more, or 220° C. or more, or 230° C. or more; ii) a pour point less than −20° C., preferably less than −25° C., or less than −30° C., or less than −35° C., or less than −40° C.; and iii) a KV100° C. of 10 cSt or more, preferably 35 cSt or more, or 40 cSt or more, or 60 cSt or more.

In yet another embodiment, the PAO or blends of PAOs have i) a KV100° C. of at least 3 cSt, preferably at least 4 cSt, or at least 6 cSt, or at least 8 cSt, or at least 10 cSt; ii) a VI of at least 120, preferably at least 130, or at least 140, or at least 150; iii) a pour point of −15° C. or less, preferably −20° C. or less, or −30° C. or less, or −40° C. or less; and iv) a specific gravity (15.6° C.) of 0.86 or less preferably 0.855 or less, or 0.85 or less, or 0.84 or less.

Advantageous blends of PAOs include blends of two or more PAOs where the ratio of the highest KV100° C. to the lowest KV100° C. is at least 1.5, preferably at least 2, or at least 3, or at least 5. Other blends of PAO also include two or more PAOs where at least one PAO has a KV100° C. of 300 cSt or more and at least one other PAO has a KV100° C. of less than 300 cSt; or a blend where at least one PAO has a KV100° C. of 150 cSt or more and at least one other PAO has a KV100° C. of less than 150 cSt; or a blend where at least one PAO has a KV100° C. of 100 cSt or more and at least one other PAO has a KV100° C. of less than 100 cSt; or a blend where at least one PAO has a KV100° C. of 40 cSt or more and at least one PAO has a KV100° C. of less than 40 cSt; or at least one PAO has a KV100° C. of 10 cSt or more and at least one PAO has a KV100° C. of less than 10 cSt.

When a PAO or combination of more than one PAOs is employed, it is preferred that the PAO or combination of PAOs have a pour point less than or equal to −38° C. and/or a Kinematic viscosity less than or equal to 10.5 cSt at 100° C. Such formulations may include a PAO having one or more of the properties described herein and another PAO with properties that may or may not have one or more of the properties described herein as long as the combination of PAOs have a pour point less than or equal to −38° C. and/or a Kinematic viscosity less than or equal to 10.5 cSt at 100° C.

Desirable PAOs are available as SpectraSyn™ and SpectraSyn Ultra™ from ExxonMobil Chemical in Houston, Tex. (previously sold under the SHF and SuperSyn™ tradenames by ExxonMobil Chemical Company). Other useful PAOs include Synfluid™ available from ChevronPhillips Chemical Company (Pasadena, Tex.), Durasyn™ available from Innovene (Chicago, Ill.), Nexbase™ available from Neste Oil (Keilaniemi, Finland), and Synton™ available from Chemtura Corporation (Middlebury, Conn.). The percentage of carbons in chain-type paraffinic structures ($C_P$) is close to 100% (typically greater than 98% or even 99%) for PAOs.

In a preferred embodiment of the present invention, the PAO is not an oligomer of $C_4$ olefins (i.e., 1-butene, 2-butene, isobutylene, butadiene, and mixtures thereof), including polybutenes and/or PIB and/or PNB. In another embodiment, the PAO contains less than 90 wt % (preferably less than 80 wt %, preferably less than 70 wt %, preferably less than 60 wt %, preferably less than 50 wt %, preferably less than 40 wt %, preferably less than 30 wt %, preferably less than 20 wt %, preferably less than 10 wt %, preferably less than 5 wt %, preferably less than 2 wt %, preferably less than 1 wt %, preferably 0 wt %) of $C_4$ olefins, in particular 1-butene and isobutylene.

Preferably, the PAO is not a naphthenic mineral oil (also called a naphthenic process oil or a naphthenic extender oil), nor is it an aromatic mineral oil (also called an aromatic process oil or an aromatic extender oil). More preferably, naphthenic and aromatic mineral oils are substantially absent from the compositions of the present invention. In certain embodiments, paraffinic mineral oils with a kinematic viscosity at 40° C. of less than 80 cSt and a pour point of greater than −15° C. are substantially absent from the compositions of the present invention.

High Purity Hydrocarbon Fluids

In an alternate embodiment, the HFA may be high purity hydrocarbon fluid as described at paragraph [0275] on page 16 to paragraph [0303] on page 18 of US 2008/0045638. Preferably the high purity hydrocarbon fluid has a flash point of 200° C. or more and a pour point of −15° C. or less.

In one embodiment, the HFA is a high purity hydrocarbon fluid of lubricating viscosity comprising a mixture of $C_{20}$ to $C_{120}$ paraffins, 50 wt % or more being isoparaffinic hydrocarbons and less than 50 wt % being hydrocarbons that contain naphthenic and/or aromatic structures. Preferably, the mixture of paraffins comprises a wax isomerate lubricant basestock or oil, which includes:

i. hydroisomerized natural and refined waxes, such as slack waxes, deoiled waxes, normal alpha-olefin waxes, microcrystalline waxes, and waxy stocks derived from gas oils, fuels hydrocracker bottoms, hydrocarbon raffinates, hydrocracked hydrocarbons, lubricating oils, mineral oils, polyalphaolefins, or other linear or branched hydrocarbon compounds with carbon number of about 20 or more; and ii. hydroisomerized synthetic waxes, such as Fischer-Tropsch waxes (i.e., the high boiling point residues of Fischer-Tropsch synthesis, including waxy hydrocarbons)

or mixtures thereof. Most preferred are lubricant basestocks or oils derived from hydrocarbons synthesized in a Fischer-Tropsch process as part of an overall Gas-to-Liquids (GTL) process.

In one embodiment, the mixture of paraffins has two or more of the following properties:

1. a naphthenic content of less than 40 wt % (preferably less than 30 wt %, preferably less than 20 wt %, preferably less than 15 wt %, preferably less than 10 wt %, preferably less than 5 wt %, preferably less than 2 wt %, preferably less than 1 wt %) based on the total weight of the hydrocarbon mixture; and/or
2. a normal paraffins content of less than 5 wt % (preferably less than 4 wt %, preferably less than 3 wt %, preferably less than 1 wt %) based on the total weight of the hydrocarbon mixture; and/or
3. an aromatic content of 1 wt % or less (preferably 0.5 wt % or less); and/or
4. a saturates level of 90 wt % or higher (preferably 95 wt % or higher, preferably 98 wt % or higher, preferably 99 wt % or higher); and/or
5. the percentage of carbons in chain-type paraffinic structures ($C_P$) of 80% or more (preferably 90% or more, preferably 95% or more, preferably 98% or more); and/or
6. a branched paraffin:normal paraffin ratio greater than about 10:1 (preferably greater than 20:1, preferably greater than 50:1, preferably greater than 100:1, preferably greater than 500:1, preferably greater than 1000:1); and/or
7. sidechains with 4 or more carbons making up less than 10% of all sidechains (preferably less than 5%, preferably less than 1%); and/or
8. sidechains with 1 or 2 carbons making up at least 50% of all sidechains (preferably at least 60%, preferably at least 70%, preferably at least 80%, preferably at least 90%, preferably at least 95%, preferably at least 98%); and/or
9. a sulfur content of 300 ppm or less (preferably 100 ppm or less, preferably 50 ppm or less, preferably 10 ppm or less) where ppm is on a weight basis; and/or
10. a nitrogen content of 300 ppm or less (preferably 100 ppm or less, preferably 50 ppm or less, preferably 10 ppm or less) where ppm is on a weight basis; and/or
11. a number-average molecular weight of 300 to 1800 g/mol (preferably 400 to 1500 g/mol, preferably 500 to 1200 g/mol, preferably 600 to 900 g/mol); and/or
12. a kinematic viscosity at 40° C. of 10 cSt or more (preferably 25 cSt or more, preferably between about 50 and 400 cSt); and/or
13. a kinematic viscosity at 100° C. ranging from 2 to 50 cSt (preferably 3 to 30 cSt, preferably 5 to 25 cSt, preferably 6 to 20 cSt, preferably 8 to 16 cSt); and/or
14. a viscosity index (VI) of 80 or greater (preferably 100 or greater, preferably 120 or greater, preferably 130 or greater, preferably 140 or greater, preferably 150 or greater, preferably 160 or greater, preferably 180 or greater); and/or
15. a pour point of −5° C. or lower (preferably −10° C. or lower, preferably −15° C. or lower, preferably −20° C. or lower, preferably −25° C. or lower, preferably −30° C. or lower); and/or
16. a flash point of 200° C. or more (preferably 220° C. or more, preferably 240° C. or more, preferably 260° C. or more); and/or
17. a specific gravity (15.6° C./15.6° C.) of 0.86 or less (preferably 0.85 or less, preferably 0.84 or less); and/or
18. an aniline point of 120° C. or more; and/or
19. a bromine number of 1 or less.

In a preferred embodiment, the mixture of paraffins comprises a GTL basestock or oil. GTL basestocks and oils are fluids of lubricating viscosity that are generally derived from waxy synthesized hydrocarbons, that are themselves derived via one or more synthesis, combination, transformation, and/or rearrangement processes from gaseous carbon-containing compounds and hydrogen-containing compounds as feedstocks, such as: hydrogen, carbon dioxide, carbon monoxide, water, methane, ethane, ethylene, acetylene, propane, propylene, propyne, butane, butylenes, and butynes. Preferably, the feedstock is "syngas" (synthesis gas, essentially CO and $H_2$) derived from a suitable source, such as natural gas and/or coal. GTL basestocks and oils include wax isomerates, comprising, for example, hydroisomerized synthesized waxes, hydroisomerized Fischer-Tropsch (F-T) waxes (including waxy hydrocarbons and possible analogous oxygenates), or mixtures thereof. GTL basestocks and oils may further comprise other hydroisomerized basestocks and base oils. Particularly preferred GTL basestocks or oils are those comprising mostly hydroisomerized F-T waxes and/or other liquid hydrocarbons obtained by an F-T synthesis process.

The synthesis of hydrocarbons, including waxy hydrocarbons, by F-T may involve any suitable process known in the art, including those involving a slurry, a fixed-bed, or a fluidized-bed of catalyst particles in a hydrocarbon liquid. The catalyst may be an amorphous catalyst, for example based on a Group VIII metal such as Fe, Ni, Co, Ru, and Re on a suitable inorganic support material, or a crystalline catalyst, for example a zeolitic catalyst. The process of making a lubricant basestock or oil from a waxy stock is characterized as a hydrodewaxing process. A hydrotreating step, while typically not required for F-T waxes, can be performed prior to hydrodewaxing if desired. Some F-T waxes may benefit from removal of oxygenates while others may benefit from oxygenates treatment prior to hydrodewaxing. The hydrodewaxing process is typically conducted over a catalyst or combination of catalysts at high temperatures and pressures in the presence of hydrogen. The catalyst may be an amorphous catalyst, for example based on Co, Mo, W, etc. on a suitable oxide support material, or a crystalline catalyst, for example a zeolitic catalyst such as ZSM-23 and ZSM-48 and others disclosed in U.S. Pat. No. 4,906,350, often used in conjunction with a Group VIII metal such as Pd or Pt. This process may be followed by a solvent and/or catalytic dewaxing step to lower the pour point of the hydroisomerate. Solvent dewaxing involves the physical fractionation of waxy components from the hydroisomerate. Catalytic dewaxing converts a portion of the hydroisomerate to lower boiling hydrocarbons; it often involves a shape-selective molecular sieve, such as a zeolite or silicoaluminophosphate material, in combination with a catalytic metal component, such as Pt, in a fixed-bed, fluidized-bed, or slurry type process at high temperatures and pressures in the presence of hydrogen.

Useful catalysts, processes, and compositions for GTL basestocks and oils, Fischer-Tropsch hydrocarbon derived basestocks and oils, and wax isomerate hydroisomerized basestocks and oils are described in, for example, U.S. Pat. Nos. 2,817,693; 4,542,122; 5,545,674; 4,568,663; 4,621,072; 4,663,305; 4,897,178; 4,900,407; 4,921,594; 4,923,588; 4,937,399; 4,975,177; 5,059,299; 5,158,671; 5,182,248; 5,200,382; 5,290,426; 5,516,740; 5,580,442; 5,885,438; 5,935,416; 5,935,417; 5,965,475; 5,976,351; 5,977,425; 6,025,305; 6,080,301; 6,090,989; 6,096,940; 6,103,099; 6,165,949; 6,190,532; 6,332,974; 6,375,830; 6,383,366; 6,475,960; 6,620,312; and 6,676,827; European Patents EP 324 528, EP 532 116, EP 532 118, EP 537 815, EP 583 836, EP 666 894, EP 668 342, EP 776 959; WPO patent applications WO 97/31693, WO 99/20720, WO 99/45085, WO 02/64710, WO 02/64711, WO 02/70627, WO 02/70629, WO 03/33320; and British Patents 1350257; 1390359; 1429494; and 1440230. Particularly favorable processes are described in European Patent Applications EP 464 546 and EP 464 547. Processes using Fischer-Tropsch wax feeds are described in U.S. Pat. Nos. 4,594,172; 4,943,672; 6,046,940; 6,103,099; 6,332,974; 6,375,830; and 6,475,960.

Desirable GTL-derived fluids are expected to become broadly available from several sources, including Chevron, ConocoPhillips, ExxonMobil, Sasol, SasolChevron, Shell, Statoil, and Syntroleum.

In one embodiment, the HFA is a high purity hydrocarbon fluid derived from a GTL process comprising a mixture of paraffins of carbon number ranging from about $C_{20}$ to $C_{100}$, a molar ratio of isoparaffins:n-paraffins greater than about 50:1, the percentage of carbons in paraffinic structures ($C_P$) of 98% or more, a pour point ranging from about −20 to −60° C., and a kinematic viscosity at 100° C. ranging from about 6 to 20 cSt.

As used herein, the following terms have the indicated meanings: "hydroisomerized" describes a catalytic process in which normal paraffins and/or slightly branched isoparaffins are converted by rearrangement into more branched isoparaffins (also known as "isodewaxing"); "wax" is a hydrocarbonaceous material existing as a solid at or near room temperature, with a melting point of 0° C. or above, and consisting predominantly of paraffinic molecules, most of which are normal paraffins; "slack wax" is the wax recovered from petroleum oils such as by solvent dewaxing, and may be further hydrotreated to remove heteroatoms.

Group III Mineral Oils

In an alternate embodiment, the HFA may be a Group III Mineral Oil (as described in US 2008/0045638) having a flash point of 200° C. or more and a pour point of −15° C. or less. Preferably the Group III Mineral Oil has a saturates level of 90% or more (preferably 92% or more, preferably 94% or more, preferably 95% or more, preferably 98% or more); a sulfur content of less than 0.03% (preferably between 0.001 and 0.01%); and a VI of 120 or more (preferably 130 or more, preferably 140 or more). Preferably the Group III Mineral Oil has a kinematic viscosity at 100° C. of 3 to 50, preferably 4 to 40 cSt, preferably 6 to 30 cSt, preferably 8 to 20; and/or a number average molecular weight of 300 to 5,000 g/mol, preferably 400 to 2,000 g/mol, preferably 500 to 1,000 g/mol. Preferably the Group III Mineral Oil has a pour point of −10° C. or less, a flash point of 200° C. or more, and a specific gravity (15.6° C./15.6° C.) of 0.86 or less.

Preferably, the Group III Mineral Oil is a Group III basestock. Desirable Group III basestocks are commercially available from a number of sources and include those described in the table below. The percentage of carbons in chain-type paraffinic structures ($C_P$) in such liquids is greater than 80%. Chain-type paraffins ($C_P$) are determined as described in US 2008/0045638.

| Commercially available Group III Basestocks | | | | |
|---|---|---|---|---|
| | KV @ 100° C., cSt | VI | Pour Point, ° C. | Specific gravity | Flash Point, ° C. |
| UCBO 4R [1] | 4.1 | 127 | −18 | 0.826 | 216 |
| UCBO 7R [1] | 7.0 | 135 | −18 | 0.839 | 250 |
| Nexbase 3043 [2] | 4.3 | 124 | −18 | 0.831 | 224 |
| Nexbase 3050 [2] | 5.1 | 126 | −15 | 0.835 | 240 |
| Nexbase 3060 [2] | 6.0 | 128 | −15 | 0.838 | 240 |
| Nexbase 3080 [2] | 8.0 | 128 | −15 | 0.843 | 260 |
| Yubase YU-4 [3] | 4.2 | 122 | −15 | 0.843 | 230 |
| Yubase YU-6 [3] | 6.5 | 131 | −15 | 0.842 | 240 |
| Yubase YU-8 [3] | 7.6 | 128 | −12 | 0.850 | 260 |
| Ultra-S 4 [4] | 4.3 | 123 | −20 | 0.836 | 220 |
| Ultra-S 6 [4] | 5.6 | 128 | −20 | 0.839 | 234 |
| Ultra-S 8 [4] | 7.2 | 127 | −15 | 0.847 | 256 |
| VHVI 4 [5] | 4.6 | 128 | −21 | 0.826 | |
| VHVI 8 [5] | 8.0 | 127 | −12 | 0.850 | 248 |
| Visom 4 [6] | 4.0 | | | | 210 |
| Visom 6 [6] | 6.6 | 148 | −18 | 0.836 | 250 |

[1] Available from ChevronTexaco (USA).
[2] Available from Neste Oil (Finland).
[3] Available from SK Corp (South Korea).
[4] Available from ConocoPhillips (USA)/S-Oil (South Korea).
[5] Available from PetroCanada (Canada).
[6] Available from ExxonMobil (USA).

Fillers and Additives

The elastomeric compositions may also contain other components and additives customarily used in rubber compounds, such as, for example, effective amounts of other processing aids, pigments, accelerators, cross-linking and curing materials, antioxidants, antiozonants, fillers, and/or clays.

The elastomeric composition may also optionally comprise at least one filler, for example, calcium carbonate, clay, mica, silica, silicates, talc, titanium dioxide, aluminum oxide, zinc oxide, starch, wood flour, carbon black, or mixtures thereof. The fillers may be any size and typically are in the range of about 0.0001 µm to about 100 µm, for example in the tire industry.

As used herein, silica is meant to refer to any type or particle size silica or another silicic acid derivative, or silicic acid, processed by solution, pyrogenic, or the like methods, including untreated, precipitated silica, crystalline silica, colloidal silica, aluminum or calcium silicates, fumed silica, and the like. Precipitated silica can be conventional silica, semi-highly dispersible silica, or highly dispersible silica.

The elastomeric composition may also include clay. The clay may be, for example, montmorillonite, nontronite, beidellite, bentonite, vokoskoite, laponite, hectorite, saponite, sauconite, magadite, kenyaite, stevensite, vermiculite, halloysite, aluminate oxides, hydrotalcite, or mixtures thereof. The clay may contain at least one silicate. Alternatively, the filler may be layered clay, optionally, treated or pre-treated with a modifying agent such as organic molecules; the layered clay may comprise at least one silicate.

In one embodiment, the layered filler such as layered clay may comprise at least one silicate. The silicate may comprise at least one "smectite" or "smectite-type clay" referring to the general class of clay minerals with expanding crystal lattices. For example, this may include the dioctahedral smectites which consist of montmorillonite, beidellite, and nontronite, and the trioctahedral smectites, which includes saponite, hectorite, and sauconite. Also encompassed are synthetically prepared smectite-clays, for example those produced by hydrothermal processes.

The layered filler such as the layered clays described above may be modified such as intercalated or exfoliated by treatment with at least one modifying agent. Modifying agents are also known as swelling or exfoliating agents. Generally, they are additives capable of undergoing ion exchange reactions with the cations present at the interlayer surfaces of the layered filler. The modifying agent may be present in the composition in an amount to achieve optimal air retention as measured by the permeability testing. For example, the additive may be employed in the range of 0.1 to 40 phr in one embodiment, or in the range of 0.2 to 20 phr, or in the range of 0.3 to 10 phr in another embodiment.

Examples of suitable exfoliating additives include, but are not limited to, cationic surfactants such as ammonium, alkylamines or alkylammonium (primary, secondary, tertiary and quaternary), phosphonium or sulfonium derivatives of aliphatic, aromatic or arylaliphatic amines, phosphines and sulfides.

The elastomeric compositions may incorporate a clay treated or pre-treated with a modifying agent to form a nanocomposite or nanocomposite composition. Nanocomposites may include at least one elastomer as described above and at least one modified layered filler. The modified layered filler may be produced by the process comprising contacting at least one layered filler such as at least one layered clay with at least one modifying agent.

The amount of clay or exfoliated clay incorporated in the nanocomposite is generally that which is sufficient to develop an improvement in the mechanical properties or barrier properties of the nanocomposite, for example, tensile strength or oxygen permeability. Amounts generally will be in the range of 0.5 to 10 wt % in one embodiment, or in the range of 1 to 5 wt %, based on the polymer content of the nanocomposite. Expressed in parts per hundred parts of rubber, the clay or exfoliated clay may be present in the range of 1 to 30 phr, or in the range of 5 to 20 phr.

In one embodiment, one or more, silane coupling agents are used in the elastomeric compositions. Coupling agents are particularly desirable when silica is the primary filler, or is present in combination with another filler, as they help bind the silica to the elastomer. The coupling agent may be a bifunctional organosilane crosslinking agent. An "organosilane crosslinking agent" is any silane coupled filler and/or crosslinking activator and/or silane reinforcing agent known to those skilled in the art including, but not limited to, vinyl triethoxysilane, vinyl-tris-(beta-methoxyethoxy)silane, methacryloylpropyltrimethoxysilane, gamma-amino-propyl, triethoxysilane, gammamercaptopropyltrimethoxysilane, and the like, and mixtures thereof.

The filler may be carbon black or modified carbon black. The filler may also be a blend of carbon black and silica. In one embodiment, the elastomeric composition comprises reinforcing grade carbon black at a level in the range of 10 to 100 phr of the blend, more preferably in the range of 30 to 80 phr in another embodiment, and in yet another embodiment in the range of 50 to 80 phr. Useful grades of carbon black include the ranges of from N110 to N990, preferably N660.

Crosslinking Agents, Curatives, Cure Packages, and Curing Processes

The elastomeric compositions and the articles made from those compositions are generally manufactured with the aid of at least one cure package, at least one curative, at least one crosslinking agent, and/or undergo a process to cure the elastomeric composition. As used herein, at least one curative package refers to any material or method capable of imparting cured properties to a rubber as is commonly understood in the industry.

Generally, polymer blends are crosslinked to improve the polymer's mechanical properties. Physical properties, performance characteristics, and durability of vulcanized rubber compounds are known to be related to the number (crosslink density) and type of crosslinks formed during the vulcanization reaction. Polymer blends may be crosslinked by adding curative agents, for example sulfur, metals, metal oxides such as zinc oxide, peroxides, organometallic compounds, radical initiators, fatty acids, and other agents common in the art. Other known methods of curing that may be used include, peroxide cure systems, resin cure systems, and heat or radiation-induced crosslinking of polymers. Accelerators, activators, and retarders may also be used in the curing process.

The compositions may be vulcanized (cured) by any suitable means, such as subjecting them to heat or radiation according to any conventional vulcanization process. The amount of heat or radiation needed is that which is required to affect a cure in the composition, and the invention is not herein limited by the method and amount of heat required to cure the composition. Typically, the vulcanization is conducted at a temperature in the range of about 100° C. to about 250° C., or in the range of about 150° C. to about 190° C., for about 1 to 150 minutes.

Halogen-containing elastomers may be crosslinked by their reaction with metal oxides. The metal oxide is thought to react with halogen groups in the polymer to produce an active intermediate which then reacts further to produce carbon-carbon bonds. Zinc halide is liberated as a by-product and it serves as an autocatalyst for this reaction. The metal oxide can be used alone or in conjunction with its corresponding metal fatty acid complex (e.g., zinc stearate, calcium stearate, etc.), or with the organic and fatty acids added alone, such as stearic acid, and optionally other curatives such as sulfur or a sulfur compound, an alkylperoxide compound, diamines or derivatives thereof.

Sulfur is the most common chemical vulcanizing agent for diene-containing elastomers. It exists as a rhombic 8-member ring or in amorphous polymeric forms. The sulfur vulcanization system may consist of an activator to activate the sulfur, an accelerator, and a retarder to help control the rate of vulcanization. Activators are chemicals that increase the rate of vulcanization by reacting first with the accelerators to form rubber-soluble complexes which then react with the sulfur to form sulfurating agents. General classes of accelerators include amines, diamines, guanidines, thioureas, thiazoles, thiurams, sulfenamides, sulfenimides, thiocarbamates, xanthates, and the like.

Accelerators help control the onset of and rate of vulcanization, and the number and type of crosslinks that are formed. Retarders may be used to delay the initial onset of cure in order to allow sufficient time to process the unvulcanized rubber.

The acceleration of the vulcanization process may be controlled by regulating the amount of the acceleration accelerant, often an organic compound. The mechanism for accelerated vulcanization of natural rubber, BR, and SBR involves complex interactions between the curative, accelerator, activators, and polymers. Ideally, all of the available curative is consumed in the formation of effective crosslinks which join together two polymer chains and enhance the overall strength of the polymer matrix. Numerous accelerators are known in the art and include, but are not limited to, the following: stearic acid, diphenyl guanidine (DPG), tetramethylthiuram disulfide (TMTD), benzothiazyl disulfide (MBTS), N-tertiarybutyl-2-benzothiazole sulfenamide (TBBS), N-cyclohexyl-2-benzothiazole-sulfenamide (CBS), and thioureas.

In one embodiment, at least one curing agent(s) is present in the range of 0.2 to 10 phr, or 0.5 to 5 phr, or in another embodiment in the range of 0.75 phr to 2 phr.

Processing

The elastomeric composition may be compounded (mixed) by any conventional means known to those skilled in the art. The mixing may occur in a single step or in multiple stages. For example, the ingredients are typically mixed in at least two stages, namely at least one non-productive stage followed by a productive mixing stage. The final curatives are typically mixed in the final stage which is conventionally called the "productive" mix stage. In the productive mix stage the mixing typically occurs at a temperature, or ultimate temperature, lower than the mix temperature(s) of the preceding non-productive mix stage(s). The elastomers, polymer additives, silica and silica coupler, and carbon black, if used, are generally mixed in one or more non-productive mix stages. The terms "non-productive" and "productive" mix stages are well known to those having skill in the rubber mixing art.

In one embodiment, the carbon black is added in a different stage from zinc oxide and other cure activators and accelerators. In another embodiment, antioxidants, antiozonants, and processing materials are added in a stage after the carbon black has been processed with the elastomers, and zinc oxide is added at a final stage to maximize the compound modulus. In other embodiments, additional stages may involve incremental additions of one or more fillers.

In another embodiment, mixing of the components may be carried out by combining the elastomer components, filler and clay in any suitable mixing device such as a two-roll open mill, Brabender™ internal mixer, Banbury™ internal mixer with tangential rotors, Krupp internal mixer with intermeshing rotors, or preferably a mixer/extruder, by techniques known in the art. Mixing may be performed at temperatures up to the melting point of the elastomer(s) used in the composition in one embodiment, or in the range of 40° C. to 250° C. in another embodiment, or in the range of 100° C. to 200° C. Mixing should generally be conducted under conditions of shear sufficient to allow the clay to exfoliate and become uniformly dispersed within the elastomer(s) to form the nanocomposite.

Typically, from 70% to 100% of the elastomer or elastomers is first mixed for 20 to 90 seconds, or until the temperature reaches from 40° C. to 75° C. Then, approximately 75% of the filler, and the remaining amount of elastomer, if any, is typically added to the mixer, and mixing continues until the temperature reaches from 90° C. to 150° C. Next, the remaining filler is added, as well as the processing aids, and mixing continues until the temperature reaches from 140° C. to 190° C. The masterbatch mixture is then finished by sheeting on an open mill and allowed to cool, for example, to from 60° C. to 100° C. when curatives may be added.

Mixing with the clays is performed by techniques known to those skilled in the art, wherein the clay is added to the polymer at the same time as the carbon black in one embodiment. The HFA processing aid is typically added later in the mixing cycle after the carbon black and clay have achieved adequate dispersion in the elastomeric matrix.

The cured compositions can include various elastomers and fillers with the HFA processing aid. The elastomeric compositions typically include $C_4$ to $C_7$ monoolefin elastomers, such as isobutylene-based elastomers, preferably halogenated poly(isobutylene-co-p-methylstyrene), butyl rubber, with the HFA(s) being present in the range of 2 to 40 phr in one embodiment, or 4 to 30 phr, or 4 to 15 phr, or 8 to 12 phr in another embodiment.

In one embodiment, an air barrier can be made by the method of combining at least one random copolymer comprising a $C_4$ to $C_7$ isomonoolefin derived unit, at least one filler, and at least one HFA, and at least one cure agent; and curing the combined components.

In another embodiment, an air barrier can be made by the method of combining at least one random copolymer comprising a $C_4$ to $C_7$ isomonoolefin derived unit, at least one filler, and HFA having a number average molecular weight greater than 400, and at least one cure agent; and curing the combined components as described above.

The elastomeric compositions as described above may be used in the manufacture of air membranes such as innerliners and innertubes used in the production of tires. Methods and equipment used to manufacture the innerliners and tires are well known in the art. The invention is not limited to any particular method of manufacture for articles such as innerliners or tires.

In one embodiment, a tire innerliner stock may be prepared by calendering the compounded rubber composition into sheet material having a thickness of roughly 40 to 80 mil gauge and cutting the sheet material into strips of appropriate width and length for innerliner applications. The innerliner stock at this stage of the manufacturing process is typically a sticky, uncured mass and is therefore subject to deformation and tearing as a consequence of handling and cutting operations associated with tire construction.

The innerliner stock may then be used as an element in the construction of a pneumatic tire. The pneumatic tire may be composed of a layered laminate comprising an outer surface which includes the tread and sidewall elements, an intermediate carcass layer which comprises a number of plies containing tire reinforcing fibers, (e.g., rayon, polyester, nylon or metal fibers) embedded in a rubbery matrix, and an innerliner layer which is laminated to the inner surface of the carcass layer. The tire may be built on a tire forming drum using the layers described above. After the uncured tire has been built on the drum, the uncured tire may be placed in a heated mold having an inflatable tire shaping bladder to shape it and heat it to vulcanization temperatures by methods well known in the art. Vulcanization temperatures are generally in the range of about 100° C. to about 250° C., or preferably in the range of 125° C. to 200° C., and the vulcanization time may be in them range of about one minute to several hours, or more generally in the range of about 5 to 30 minutes. Vulcanization of the assembled tire results in vulcanization of all elements of the tire assembly, for example, the innerliner, the carcass and the outer tread/sidewall layers and enhances the adhesion between these elements, resulting in a cured, unitary tire from the multi-layers.

INDUSTRIAL APPLICABILITY

The elastomeric compositions of the invention may be extruded, compression molded, blow molded, injection molded, and laminated into various shaped articles including fibers, films, laminates, layers, industrial parts such as automotive parts, appliance housings, consumer products, packaging, and the like. The elastomeric compositions are particularly useful in air barriers, such as in pneumatic tire components, hoses, air cushions, pneumatic springs, air bellows, accumulator bags, and bladders for fluid retention and curing processes.

In particular, the elastomeric compositions are useful in articles for a variety of tire applications. Such tires can be built, shaped, molded, and cured by various methods which are known and will be readily apparent to those having skill in the art. The elastomeric compositions may either be fabricated into a finished article or a component of a finished article such as an innerliner for a tire.

The elastomeric compositions of this invention are particularly suitable for tire innerliners and innertubes and other materials requiring good air retention. The elastomeric compositions are especially useful for tire innerliners requiring good air impermeability and good cold temperature properties, such as required for aircraft tires.

In preferred embodiments, the elastomeric compositions of this invention are particularly suitable for use as tire innerliners or tire innertubes, as they have enhanced thermal stability and physical properties suitable for operation under severe temperature such as required for race car tires and aircraft tires. The elastomeric compositions possess improved low-temperature toughness without sacrificing other advantageous traits such as improved processability and air-impermeability.

In particular the elastomeric compositions are useful for aircraft tires. Aircraft tires must withstand extreme conditions during service, in particular in terms of applied load and speed, taking into account the tire's low weight and size. Aircraft tires are subject to extreme loads and deflections and are subject to extreme accelerations and very high speeds particularly during landings, takeoffs and after prolonged taxiing the tires can build up high heat all of which contribute to rapid wear. During takeoff, very high speeds, of the order of 350 km/hr or even 450 km/hr, are achieved, and hence heating conditions exist which are also very severe.

Aircraft tires distinguished from other tires in that they generally require an inflation pressure greater than 9 bar (0.9 MPa) and a relative deflection greater than 30%. The deflection of a tire is defined by the radial deformation of the tire, or variation in the radial height of the tire, when it changes from a non-loaded state to a statically loaded state, under rated load and pressure conditions. It is expressed in the form of relative deflection, which is defined by the ratio of this variation in the radial height of the tire to half the difference between the external diameter of the tire and the maximum diameter of the rim measured on the hook. The external diameter of the tire is measured statically in an non-loaded state at the rated pressure. Despite an aircraft tire's very high inflation pressures, greater than 9 bar, their loading or deflection during operation may commonly reach values double those observed for heavy-vehicle tires or passenger cars.

The elastomeric compositions provided herein have improved brittleness and impermeability properties, making them especially suitable for use in aircraft tires. In some embodiments, there is a synergistic effect when HFA is used allowing for the use of secondary elastomers, such as natural rubber, at lower loading levels where the brittleness is improved while maintaining the permeability with an acceptable range.

In one embodiment the cured elastomeric composition has a MOCON permeability coefficient of less than or equal to T, where $T=-0.1147Y+0.54$ where Y is the change in brittleness determined by subtracting the brittleness in ° C. of the cured elastomeric composition containing HFA from the brittleness in ° C. of a cured composition having the same components except that it contains a naphthenic oil having a flash point in the range of 160 to 170° C., a pour point of about $-40° C.±5\%$, and a specific gravity at 15.6° C. of about $0.91±0.01$ instead of the HFA. In some embodiments, the cured elastomeric composition has a MOCON permeability coefficient of less than or equal to T, where $T=-0.1147Y+0.50$, or where $T=-0.1147Y+0.45$. In such embodiments, the HFA is preferably a PAO.

In another embodiment, the cured elastomeric composition has a MOCON permeability coefficient of less than or equal to Z, where $Z=0.282X+0.4817$ where X is the amount of natural rubber in phr, and has a brittleness of less than or equal to A, where $A=-0.13X-51$ where X is the amount of natural rubber in phr. In some embodiments, the cured elastomeric composition has a MOCON permeability coefficient of less than or equal to Z, where $Z=0.0155Y+0.6187$. In some embodiments, the cured elastomeric composition has a brittleness of less than or equal to A, where $A=-0.13X-50.5$, or where $A=-0.13X-51.5$, or where $A=-0.13X-52$. In such embodiments, the cured elastomeric composition preferably comprises a PAO.

In yet another embodiment, the cured elastomeric composition comprises 1 to 30 phr of HFA and has a permeability that is at least 10% less, or 15% less, or 25% less, or 30% less, or 35% less than the permeability of a cured composition having the same components except that it contains a naphthenic oil having a flash point in the range of 160 to 170° C., a pour point of about −40° C., and a specific gravity at 15.6° C. of about 0.91 instead of the HFA. In such embodiments, the HFA is preferably a PAO.

In a further embodiment, the cured elastomeric composition comprises 1 to 30 phr of HFA and has a brittleness temperature that is at least 1° C. less, or 1.5° C. less, or 2° C. less, or 3° C. less, than the brittleness temperature of a cured composition having the same components except that it contains a naphthenic oil having a flash point in the range of 160 to 170° C., a pour point of about −40° C., and a specific gravity at 15.6° C. of about 0.91 instead of the HFA. In such embodiments, the HFA is preferably a PAO.

In still another embodiment, the cured elastomeric composition comprises 1 to 30 phr of HFA and has a brittleness temperature that is at least 2° C. less, or 3° C. less, or 4° C. less, or 5° C. less, than the brittleness temperature of a cured composition comprising 100 phr of BIIR, 0 phr of NR, and a naphthenic oil having a flash point in the range of 160 to 170° C., a pour point of about −40° C., and a specific gravity at 15.6° C. of about 0.91 instead of the HFA. In such embodiments, the HFA is preferably a PAO.

In some embodiments, the use of HFA instead of a naphthenic oil reduces the Tg of the elastomeric composition. This is particularly advantageous as a high Tg makes the materials brittle, especially at low temperatures. The elastomeric composition comprising PAO may have a Tg less than or equal to −45° C., or less than or equal to −50° C., or less than or equal to −55° C.

In alternate embodiments, this invention relates to:
1. A cured elastomeric composition for use in a tire innerliner, comprising: (a) from 50 to 100 phr of at least one isobutylene-based elastomer; (b) less than or equal to 50 phr of natural rubber; and (c) from 1 to 30 phr of at least one hydrocarbon fluid additive, wherein the hydrocarbon fluid additive has a flash point of at least 200° C., a pour point of less than or equal to −15° C., and specific gravity at 15.6° C. of less than or equal to 0.880; wherein the cured elastomeric composition has a MOCON permeability coefficient of less than or equal to T, where T=−0.1147Y+0.54 where Y is the change in brittleness determined by subtracting the brittleness in ° C. of the cured elastomeric composition containing the hydrocarbon fluid additive from the brittleness in ° C. of a cured composition having the same components except that it contains a naphthenic oil having a flash point in the range of 160 to 170° C., a pour point of about −40° C.±5%, and a specific gravity at 15.6° C. of about 0.91±0.01 instead of the hydrocarbon fluid additive.
2. The composition of paragraph 1, wherein the isobutylene-based elastomer is selected from the group consisting of butyl rubber, halogenated butyl rubber, star-branched butyl rubber, halogenated star-branched butyl rubber, poly(isobutylene-co-p-methylstyrene), halogenated poly(isobutylene-co-p-methylstyrene), and mixtures thereof.
3. The composition of paragraph 1 or 2, wherein the composition comprises less than or equal to 10 phr of natural rubber.
4. The composition of any one of paragraphs 1 to 3, wherein the hydrocarbon fluid additive is selected from a group consisting of polyalphaolefins, high purity hydrocarbon fluids, water white group III mineral oils, and blends thereof.
5. The composition of any one of paragraphs 1 to 3, wherein the hydrocarbon fluid additive is a polyalphaolefin having a Kinematic viscosity at 100° C. of at least 4 cSt.
6. The composition of any one of paragraphs 1 to 3 or 5, wherein the hydrocarbon fluid additive is a polyalphaolefin having a Kinematic viscosity at 100° C. in the range of 6 to 40 cSt.
7. The composition of any one of paragraphs 1 to 3, 5, or 6, wherein the hydrocarbon fluid additive is a polyalphaolefin having a viscosity index of at least 120.
8. The composition of any one of paragraphs 1 to 7, wherein the composition is substantially free of naphthenic oil and/or is substantially free of aromatic oil.
9. The composition of any one of paragraphs 1 to 8, wherein the composition further comprises one or more filler components selected from calcium carbonate, mica, silica, silicates, talc, titanium dioxide, starch, wood flour, carbon black, and mixtures thereof.
10. The composition of any one of paragraphs 1 to 9, wherein the composition is a tire innerliner suitable for use in an aircraft tire.
11. A cured elastomeric composition for use in a tire innerliner, comprising: (a) from 50 to 90 phr of at least one isobutylene-based elastomer; (b) from 1 to 50 phr of natural rubber; and (c) from 1 to 30 phr of at least one hydrocarbon fluid additive, wherein the hydrocarbon fluid additive has a flash point of at least 200° C., a pour point of less than or equal to −15° C., and specific gravity at 15.6° C. of less than or equal to 0.880; wherein the cured elastomeric composition has a MOCON permeability coefficient of less than or equal to Z, where Z=0.282X+0.4817 where X is the amount of natural rubber in phr, and wherein the cured elastomeric composition has a brittleness of less than or equal to A, where A=−0.13X−51 where X is the amount of natural rubber in phr.
12. An aircraft tire comprising an innerliner which comprises: (a) from 50 to 90 phr of at least one isobutylene-based elastomer; (b) from 1 to 50 phr of natural rubber; and (c) from 1 to 30 phr of at least one hydrocarbon fluid additive, wherein the hydrocarbon fluid additive has a flash point of at least 200° C., a pour point of less than or equal to −15° C., and specific gravity at 15.6° C. of less than or equal to 0.880; wherein the aircraft tire has a MOCON permeability coefficient of less than or equal to Z, where Z=0.282X+0.4817 where X is the amount of natural rubber in phr, and wherein the cured elastomeric composition has a brittleness of less than or equal to A, where A=−0.13X−51 where X is the amount of natural rubber in phr.
13. The composition of paragraph 11 or 12, wherein the composition comprises from 70 to 90 phr of the isobutylene-based elastomer.
14. The composition of any one of paragraphs 11 to 13, wherein the isobutylene-based elastomer is selected from the group consisting of butyl rubber, halogenated butyl rubber, star-branched butyl rubber, halogenated star-branched butyl rubber, poly(isobutylene-co-p-methylstyrene), halogenated poly(isobutylene-co-p-methylstyrene), and mixtures thereof.
15. The composition of any one of paragraphs 11 to 14, wherein the composition comprises from 10 to 30 phr of natural rubber.
16. The composition of any one of paragraphs 11 to 15, wherein the hydrocarbon fluid additive is selected from a group consisting of polyalphaolefins, high purity hydrocarbon fluids, water white group III mineral oils, and blends thereof.
17. The composition of any one of paragraphs 11 to 15, wherein the hydrocarbon fluid additive is a polyalphaolefin having a Kinematic viscosity at 100° C. of at least 4 cSt.
18. The composition of any one of paragraphs 11 to 15, or 17, wherein the hydrocarbon fluid additive is a polyalphaolefin having a Kinematic viscosity at 100° C. in the range of 6 to 40 cSt.

19. The composition of any one of paragraphs 11 to 15, 17, or 18, wherein the hydrocarbon fluid additive is a polyalphaolefin having a viscosity index of at least 120.
20. The composition of any one of paragraphs 11 to 19, wherein the composition is substantially free of naphthenic oil and/or is substantially free of aromatic oil.
21. The composition of any one of paragraphs 11 to 20, wherein the composition further comprises one or more filler components selected from calcium carbonate, mica, silica, silicates, talc, titanium dioxide, starch, wood flour, carbon black, and mixtures thereof.
22. The composition of any one of paragraphs 11 or 13 to 20, wherein the composition is a tire innerliner suitable for use in an aircraft tire.
23. A process for producing an air barrier comprising the steps of: (a) combining from 50 to 90 phr of at least one isobutylene-based elastomer, from 1 to 50 phr of natural rubber, and from 1 to 30 phr of at least one hydrocarbon fluid additive, wherein the hydrocarbon fluid additive has a flash point of at least 200° C., a pour point of less than or equal to −15° C., and specific gravity at 15.6° C. of less than or equal to 0.880; (b) curing the combined components to form a cured elastomeric composition wherein the cured elastomeric composition has a MOCON permeability coefficient of less than or equal to Z, where $Z=0.282X+0.4817$ where X is the amount of natural rubber in phr, and wherein the cured elastomeric composition has a brittleness of less than or equal to A, where $A=-0.13X-51$ where X is the amount of natural rubber in phr; and (c) shaping the cured elastomeric composition to form the air barrier.
24. The process of paragraph 23, wherein the air barrier is an innerliner suitable for use in an aircraft tire.
25. The composition of paragraph 23 or 24, wherein the composition comprises from 70 to 90 phr of the isobutylene-based elastomer.
26. The composition of any one of paragraphs 23 to 25, wherein the isobutylene-based elastomer is selected from the group consisting of butyl rubber, halogenated butyl rubber, star-branched butyl rubber, halogenated star-branched butyl rubber, poly(isobutylene-co-p-methylstyrene), halogenated poly(isobutylene-co-p-methylstyrene), and mixtures thereof.
27. The composition of any one of paragraphs 23 to 26, wherein the composition comprises from 10 to 30 phr of natural rubber.
28. The composition of any one of paragraphs 23 to 27, wherein the hydrocarbon fluid additive is selected from a group consisting of polyalphaolefins, high purity hydrocarbon fluids, water white group III mineral oils, and blends thereof.
29. The composition of any one of paragraphs 23 to 27, wherein the hydrocarbon fluid additive is a polyalphaolefin having a Kinematic viscosity at 100° C. of at least 4 cSt.
30. The composition of any one of paragraphs 23 to 27, or 29, wherein the hydrocarbon fluid additive is a polyalphaolefin having a Kinematic viscosity at 100° C. in the range of 6 to 40 cSt.
31. The composition of any one of paragraphs 23 to 27, 29, or 30, wherein the hydrocarbon fluid additive is a polyalphaolefin having a viscosity index of at least 120.
32. The composition of any one of paragraphs 23 to 31, wherein the composition is substantially free of naphthenic oil and/or is substantially free of aromatic oil.
33. The composition of any one of paragraphs 23 to 32, wherein the composition further comprises one or more filler components selected from calcium carbonate, mica, silica, silicates, talc, titanium dioxide, starch, wood flour, carbon black, and mixtures thereof.

Testing Procedures

When possible, standard ASTM tests were used to determine the cured compound physical properties. Stress/strain properties (e.g., tensile strength, elongation at break, modulus values, energy to break) were measured according to ASTM D412 Die C at room temperature using an Instron 4202. Tensile strength measurements were made at ambient temperature; the specimens (dog-bone shaped) had a restricted width of 6 mm and a restricted length of 33 mm between two tabs. Though the thickness of the test specimen was a nominal 2.00 mm, the thickness of the specimens varied and was measured manually by a Mitutoyo Digimatic Indicator connected to the system computer. The specimens were pulled at a crosshead speed of 500 mm/min and the stress/strain data was recorded. The average stress/strain value of at least three specimens is reported. The error ($2\sigma$) in Tensile measurements is ±0.47 MPa. The error ($2\sigma$) in measuring 100% Modulus is ±0.11 MPa; the error ($2\sigma$) in measuring elongation is ±13%.

Cure properties were measured using an MDR 2000 from Alpha Technologies, Inc. at the indicated temperature and 0.5 degree arc, based on ASTM D 5289. The values "MH" and "ML" used herein refer to "maximum torque" and "minimum torque," respectively. The "MS" value is the Mooney scorch value, the "ML(1+8)" value is the Mooney viscosity value of the polymer, and the "ML(1+4)" value is the Mooney viscosity value of the composition. The error ($2\sigma$) in the Mooney viscosity measurement is ±0.65. The values of "Tc" are cure times in minutes, and "Ts" is scorch time in minutes.

Permeability was measured using a Mocon OxTran Model 2/61 oxygen transmission rate test apparatus. The oxygen transmission rate is measured under the principle of dynamic measurement of oxygen transport through a thin film. Compound samples are clamped into a diffusion cell. The samples are approximately 5.0 cm in diameter and about 0.5 mm thick. The cell is then purged of residual oxygen using a high purity nitrogen carrier gas. The nitrogen gas is routed to a sensor until a stable zero value is established. The measurement is typically conducted at 60° C. Pure oxygen air is then introduced into the outside of the chamber of the diffusion cell. The oxygen diffusing through the sample to the inside chamber is conveyed to a chamber which measures the oxygen diffusion rate. The oxygen diffusion rate is expressed as a transmission rate coefficient. The permeation coefficient is a measure of the transmission rate normalized for sample thickness (e.g., mm) and is expressed as a volume of gas (e.g., cc) per unit area (e.g., $m^2$) of the sample in a discrete unit of time (e.g., 24 hours), and has the units of cc*mm/($m^2$-day). The permeability coefficient considers atmospheric pressure and is expressed as cc*mm/($m^2$-day-mmHg). A relative rating for the compound may then be obtained by comparing the compound's permeation coefficient to that of the control compound.

Techniques for determining the molecular weight (Mn, Mw, and Mz) and Mw/Mn (molecular weight distribution, "MWD") of the PAO are generally described in U.S. Pat. No. 2008/0045638, which is incorporated herein by reference.

Color is determined on the APHA scale by ASTM D 1209. Note that an APHA color of 100 corresponds to a Saybolt color (ASTM D 156) of about +10; an APHA color of 20 corresponds to a Saybolt color of about +25; and an APHA color of 0 corresponds to a Saybolt color of about +30.

Carbon type composition is determined by ASTM D 2140, and gives the percentage of aromatic carbons ($C_A$), naphthenic carbons ($C_N$), and paraffinic carbons ($C_P$) in the fluid. Specifically, $C_A$ is the wt % of total carbon atoms in the fluid that are in aromatic ring-type structures; $C_N$ is the wt % of total carbon atoms in the fluid that are in saturated ring-type structures; and $C_P$ is the wt % of total carbon atoms in the fluid that are in paraffinic chain-type structures. ASTM D 2140 involves calculating a "Viscosity Gravity Constant" (VGC) and "Refractivity Intercept" (RI) for the fluid, and determining the carbon type composition from a correlation based on these two values. However, this method is known to fail for highly paraffinic oils, because the VGC and RI values fall outside the correlation range. Therefore, for purposes of this invention, the following protocol is used: If the calculated VGC (ASTM D 2140) for a fluid is 0.800 or greater, the carbon type composition including $C_P$ is determined by ASTM D 2140. If the calculated VGC (ASTM D 2140) is less than 0.800, the fluid is considered to have $C_P$ of at least 80%. If the calculated VGC (ASTM D 2140) is less than 0.800 but greater than 0.765, then ASTM D 3238 is used to determine the carbon type composition including $C_P$. If application of ASTM D 3238 yields unphysical quantities (e.g., a negative $C_A$ value), then $C_P$ is defined to be 100%. If the calculated VGC (ASTM D 2140) for a fluid is 0.765 or less, then $C_P$ is defined to be 100%.

Other test methods are listed in Table 1.

TABLE 1

Test Methods

| Parameter | Units | Test |
|---|---|---|
| Mooney Viscosity (composition) ML 1 + 4, 100° C. | MU | ASTM D 1646 |
| Hardness | Shore A | ASTM D 2240 |
| Mooney Scorch Time 135° C. for 60 min, 1 min preheat | | |
| t5 | minutes | ASTM D 1646 |
| t10 | minutes | |
| Moving Die Rheometer (MDR) 160° C. for 60 min, ±0.5° arc | | |
| ML | deciNewton.meter | ASTM D 5289 |
| MH | dNewton.m | |
| t25 | minutes | |
| t90 | minutes | |
| Tensile Test | | |
| 100% Modulus | MPa | ASTM D 412 |
| 300% Modulus | MPa | die C |
| Tensile Strength | MPa | |
| % Elongation at Break | % | |
| Mocon Oxygen Permeability Test | | |
| 60° C., 20% oxygen concentration Permeability Coefficient | cc*mm(m²-day-mmHg) | See text. |
| Cold Brittleness | ° C. | ASTM D746 |
| Tg of Elastomeric Composition | ° C. | DSC* |

*According to the differential scanning calorimetry procedure described in Paragraph [0597] of US 2008/0045638.

Testing procedures not described herein are described in US 2008/0045638, which is incorporated by reference herein.

EXAMPLES

Elastomeric compositions comprising at least one isobutylene-based elastomer and at least one PAO will now be further described with reference to the following non-limiting examples. The test methods used in the Examples are as described above. The PAOs used in the examples were prepared with either $BF_3$ or $AlCl_3$ catalyst systems. Table 2 lists typical physical and chemical properties of the various PAOs used in the examples. A listing of the various other components used in the elastomeric compositions of the examples is in Table 3.

TABLE 2

PAO Properties

| PAO | Pour Point | Specific Gravity @ 15.6° C. | Flash Point | Kinematic Viscosity @ 100° C. | Viscosity Index |
|---|---|---|---|---|---|
| A | −57° C. | 0.827 | 246° C. | 6 cSt | 138 |
| B | −36° C. | 0.850 | 281° C. | 40 cSt | 170 |

TABLE 3

Various Components in the Elastomeric Compositions

| Material | Brief Description | Source |
|---|---|---|
| BIIR 2222 | Brominated butyl rubber, 27-37 Mooney Viscosity | Bromobutyl-2222, ExxonMobil Chemical Company |
| N660 | Carbon black. | |
| Calsol ™ 810 | Naphthenic Oil, ASTM Type 103 | R. E. Carroll, Inc. (Trenton, NJ) |
| Struktol 40MS | Composition of aliphatic-aromatic-napthenic resins. | Strucktol Co. of America (Stow, OH) |
| SP-1068 | Alkyl phenol formaldehyde resin. | Schenectady Int. (Schnectady, NY) |
| Stearic Acid | Activator | ACI 5106NF, Witco Manufacturing |
| SMR 20 | Natural rubber. | |
| Kadox ™ 911 | Zinc Oxide | Zinc Corp. of America (Monaca, PA) |
| MBTS | 2-Mercaptobenzothiazole disulfide | Altax MBTS |
| Sulfur | Rubbermakers Sulfur | R E Carrol |

Example 1

Various PAOs were evaluated as process aids in model tire innerliner compounds. Naphthenic oil is typically used in such compounds at 8 phr. In the compounds of Example 1, PAO was either mixed with naphthenic oil or replaced the naphthenic oil. The compound formulations are listed in Table 4, all amounts listed are in phr. The compounds were mixed in a 1 L Banbury mixer using a 2-stage mixing procedure. The vulcanization system (Kadoz 911, MBTS, and Sulfur) were added in the second stage. The compounds were tested for a range of processing, curing, and physical properties. The data is presented in Table 5.

TABLE 4

Model Tire Innerliner Compound Formulations

| | Compound | | | | | |
|---|---|---|---|---|---|---|
| | 1 | 2 | 3 | 4 | 5 | 6 |
| BIIR 2222 | 100.00 | 100.00 | 100.00 | 100.00 | 100.00 | 100.00 |
| N660 | 60.00 | 60.00 | 60.00 | 60.00 | 60.00 | 60.00 |
| Calsol 810 | 8.00 | 4.00 | | 4.00 | | |

TABLE 4-continued

Model Tire Innerliner Compound Formulations

| | Compound | | | | | |
|---|---|---|---|---|---|---|
| | 1 | 2 | 3 | 4 | 5 | 6 |
| PAO-A | | 4.00 | 8.00 | | | 4.00 |
| PAO-B | | | | 4.00 | 8.00 | 4.00 |
| Struktol 40MS | 7.00 | 7.00 | 7.00 | 7.00 | 7.00 | 7.00 |
| SP-1068 | 4.00 | 4.00 | 4.00 | 4.00 | 4.00 | 4.00 |
| Stearic Acid | 1.00 | 1.00 | 1.00 | 1.00 | 1.00 | 1.00 |
| Kadox 911 | 1.00 | 1.00 | 1.00 | 1.00 | 1.00 | 1.00 |
| MBTS | 1.25 | 1.25 | 1.25 | 1.25 | 1.25 | 1.25 |
| Sulfur | 0.50 | 0.50 | 0.50 | 0.50 | 0.50 | 0.50 |

Typically, a compound viscosity in the range of 50 to 60 MU, a tensile strength in the range of 9 to 11 MPa, an elongation at break of greater than 700%, and a 300% modulus of 4 MPa or less are desirable to ensure adequate processing qualities in a factory and adequate performance in a tire. As seen in Table 5, the compounds of Example 1 where the PAOs have been mixed with naphthenic oil or have replaced the naphthenic oil had comparable compound properties to Compound 1, which contained only naphthenic oil.

Example 2

In Example 2, model tire innerliner compounds were made which contained varying amounts of halogenated butyl rubber and natural rubber. PAO-A and PAO-B were used to replace the naphthenic oil which would typically be used in the compounds. The compound formulations are listed in Table 6, all amounts listed are in phr. The compounds were tested for a range of processing, curing, and physical properties, with the results listed in Table 7.

TABLE 5

Properties of Model Tire Innerliner Compounds with PAO

| | | Compound | | | | | |
|---|---|---|---|---|---|---|---|
| | | 1 | 2 | 3 | 4 | 5 | 6 |
| Mooney Viscosity 100° C., 4 min, 1 min preheat | | | | | | | |
| ML 1 + 4 | [MU] | 55.4 | 56.1 | 54.3 | 57.7 | 58.5 | 56.6 |
| Mooney Scorch 135° C., 1 min preheat | | | | | | | |
| t5 | | 16.0 | 16.3 | 16.4 | 16.7 | 17.1 | 15.6 |
| t10 | | 18.4 | 18.9 | 19.3 | 19.5 | 20.1 | 18.2 |
| MDR 160° C., 0.5° arc, 60 min | | | | | | | |
| ML | [dNm] | 1.31 | 1.32 | 1.27 | 1.37 | 1.42 | 1.35 |
| MH | [dNm] | 3.92 | 4.47 | 4.47 | 4.31 | 4.72 | 4.66 |
| ts1 | [min] | 4.05 | 3.95 | 3.92 | 4.17 | 4.05 | 3.75 |
| t25 | [min] | 3.19 | 3.45 | 3.49 | 3.47 | 3.62 | 3.38 |
| t50 | [min] | 4.84 | 5.22 | 5.32 | 5.38 | 5.53 | 5.19 |
| t90 | [min] | 11.00 | 12.38 | 13.10 | 12.62 | 12.61 | 14.00 |
| t95 | [min] | 14.06 | 18.60 | 19.02 | 17.18 | 18.00 | 21.12 |
| Hardness 3 sec delay, 23° C. | | | | | | | |
| [Shore A] (Median Values Reported) | | 39.8 | 40.6 | 40.7 | 40.1 | 40.9 | 40.2 |
| Tensile 1000 | | | | | | | |
| 100% Modulus | [MPa] | 0.88 | 0.94 | 0.98 | 1.02 | 1.08 | 0.99 |
| 300% Modulus | [MPa] | 2.64 | 2.91 | 3.03 | 3.16 | 3.42 | 3.05 |
| Tensile Strength | [MPa] | 8.97 | 9.11 | 9.50 | 9.40 | 9.77 | 9.39 |
| % Elongation at Break (Median Values Reported) | [%] | 833.72 | 802.84 | 774.45 | 758.76 | 754.96 | 806.14 |
| MOCON Permeability Test Air @ 60° C. | | | | | | | |
| Permeability Coefficient (Avg of 2 Specimens Reported) | [cc*mm/(m²-day-mmHg)] | 0.51685 | 0.5385 | 0.62075 | 0.5372 | 0.7524 | 0.7891 |
| Cold Brittleness | | | | | | | |
| [° C.] | | −50.2 | −51 | −52.6 | −51 | −51.4 | −52.2 |

TABLE 6

Model Tire Innerliner Compound Formulations

| Compound | 7 | 8 | 9 | 10 | 11 | 12 | 13 | 14 | 13 |
|---|---|---|---|---|---|---|---|---|---|
| BIIR 2222 | 80.00 | 80.00 | 80.00 | 80.00 | 80.00 | 80.00 | 60.00 | 60.00 | 60.00 |
| SMR 20 | 20.00 | 20.00 | 20.00 | 20.00 | 20.00 | 20.00 | 40.00 | 40.00 | 40.00 |
| N660 | 60.00 | 60.00 | 60.00 | 60.00 | 60.00 | 60.00 | 60.00 | 60.00 | 60.00 |
| Calsol 810 | 8.00 | | | | | | | | 8.00 |
| PAO-A | | 8.00 | | 4.00 | 12.00 | | | 8.00 | |
| PAO-B | | | 8.00 | 4.00 | | 12.00 | | | 8.00 |
| Struktol 40MS | 7.00 | 7.00 | 7.00 | 7.00 | 7.00 | 7.00 | 7.00 | 7.00 | 7.00 |

TABLE 6-continued

Model Tire Innerliner Compound Formulations

| Compound | 7 | 8 | 9 | 10 | 11 | 12 | 13 | 14 | 13 |
|---|---|---|---|---|---|---|---|---|---|
| SP-1068 | 4.00 | 4.00 | 4.00 | 4.00 | 4.00 | 4.00 | 4.00 | 4.00 | 4.00 |
| Stearic Acid | 1.00 | 1.00 | 1.00 | 1.00 | 1.00 | 1.00 | 1.00 | 1.00 | 1.00 |
| Kadox 911 | 1.00 | 1.00 | 1.00 | 1.00 | 1.00 | 1.00 | 1.00 | 1.00 | 1.00 |
| MBTS | 1.25 | 1.25 | 1.25 | 1.25 | 1.25 | 1.25 | 1.25 | 1.25 | 1.25 |
| Sulfur | 0.50 | 0.50 | 0.50 | 0.50 | 0.50 | 0.50 | 0.50 | 0.50 | 0.50 |

TABLE 7

Properties of Model Tire Innerliner Compounds with PAO & Natural Rubber

| Compound | | 7 | 8 | 9 | 10 | 11 | 12 | 13 | 14 | 15 |
|---|---|---|---|---|---|---|---|---|---|---|
| Mooney Viscosity, 100° C., 4 min, 1 min preheat | | | | | | | | | | |
| ML 1 + 4 | [MU] | 52.7 | 51.7 | 54 | 51.4 | 43.9 | 46.2 | 49.3 | 46.6 | 48.1 |
| Mooney Scorch, 135° C., 1 min preheat | | | | | | | | | | |
| t5 | | 8.1 | 7.5 | 7.4 | 7.7 | 8.4 | 8.1 | 7.4 | 7.0 | 6.8 |
| t10 | | 10.3 | 9.3 | 9.0 | 9.6 | 10.7 | 10.2 | 8.9 | 8.6 | 8.2 |
| MDR, 160° C., 0.5° arc, 60 min | | | | | | | | | | |
| ML | [dNm] | 1.34 | 1.30 | 1.41 | 1.32 | 1.10 | 1.17 | 1.34 | 1.27 | 1.33 |
| MH | [dNm] | 4.79 | 5.32 | 4.99 | 4.34 | 4.42 | 4.56 | 5.87 | 5.68 | 5.79 |
| ts1 | [min] | 4.14 | 3.92 | 4.04 | 4.26 | 4.42 | 4.44 | 3.51 | 3.48 | 3.42 |
| t25 | [min] | 3.81 | 3.94 | 3.77 | 3.56 | 4.02 | 4.08 | 3.82 | 3.74 | 3.69 |
| t50 | [min] | 5.59 | 5.68 | 5.76 | 5.48 | 5.84 | 6.03 | 5.41 | 5.35 | 5.35 |
| t90 | [min] | 10.51 | 11.16 | 10.81 | 10.22 | 11.02 | 11.44 | 10.49 | 10.33 | 10.54 |
| t95 | [min] | 12.59 | 13.55 | 13.03 | 12.05 | 13.32 | 14.00 | 12.70 | 12.52 | 12.74 |
| Shore A Hardness, 3 sec delay, 23° C. (Median Value Reported) | | 39.9 | 42.9 | 42.4 | 42.6 | 39.5 | 40.5 | 43.1 | 42.9 | 43.1 |
| Tensile 1000 | | | | | | | | | | |
| 100% Modulus | [MPa] | 1.02 | 1.11 | 1.05 | 1.08 | 0.82 | 0.95 | 1.13 | 0.92 | 1.17 |
| 300% Modulus | [MPa] | 3.27 | 3.48 | 3.27 | 3.31 | 2.48 | 3.11 | 3.79 | 2.97 | 4.09 |
| Tensile Strength | [MPa] | 9.15 | 9.45 | 9.71 | 9.36 | 8.60 | 9.39 | 11.82 | 10.24 | 11.65 |
| % Elongation at Break (Median Value Reported) | [%] | 749.11 | 713.95 | 753.99 | 754.88 | 800.33 | 772.19 | 704.03 | 711.88 | 678.47 |
| MOCON Permeability Test Air @ 60° C. | | | | | | | | | | |
| Permeability Coefficient (Avg of 2 Specimens Reported) | [cc*mm/(m²-day-mmHg)] | 1.14345 | 1.04265 | 0.92205 | 0.9405 | 1.2851 | 1.0746 | 1.70825 | 1.97995 | 1.8112 |
| Cold Brittleness | [° C.] | −52.2 | −52.6 | −52.2 | −53.8 | −57.4 | −57 | −55.4 | −58.6 | −57.4 |

Example 3

In Example 3, model tire innerliner compounds were made which contained varying amounts of halogenated butyl rubber and natural rubber. PAO-A and PAO-B were used to replace the naphthenic oil which would typically be used in the compounds. The compound formulations are listed in Table 8, all amounts listed are in phr. The compounds were tested for a range of processing, curing, and physical properties, with the results listed in Table 9.

TABLE 8

Model Tire Innerliner Compound Formulations

| | Compound | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| BIIR 2222 | 100 | 100 | 100 | 100 | 100 | 80 | 80 | 80 | 80 | 80 | 80 | 80 |
| SMR20 | | | | | | 20 | 20 | 20 | 20 | 20 | 20 | 20 |
| N660 | 60 | 60 | 60 | 60 | 60 | 60 | 60 | 60 | 60 | 60 | 60 | 60 |
| Struktol 40MS | 7 | 7 | 7 | 7 | 7 | 7 | 7 | 7 | 7 | 7 | 7 | 7 |
| SP-1068 | 4 | 4 | 4 | 4 | 4 | 4 | 4 | 4 | 4 | 4 | 4 | 4 |
| Stearic Acid | 1 | 1 | 1 | 1 | 1 | 1 | 1 | 1 | 1 | 1 | 1 | 1 |
| Calsol 810 | 8 | | | | | 8 | | | | | | |
| PAO-A | | 12 | | 16 | | | 12 | | 16 | | 20 | |
| PAO-B | | | 12 | | 16 | | | 12 | | 16 | | 20 |
| Kadox 911 | 1 | 1 | 1 | 1 | 1 | 1 | 1 | 1 | 1 | 1 | 1 | 1 |
| MBTS | 1.25 | 1.25 | 1.25 | 1.25 | 1.25 | 1.25 | 1.25 | 1.25 | 1.25 | 1.25 | 1.25 | 1.25 |
| Sulfur | 0.5 | 0.5 | 0.5 | 0.5 | 0.5 | 0.5 | 0.5 | 0.5 | 0.5 | 0.5 | 0.5 | 0.5 |

TABLE 9

Properties of Model Tire Innerliner Compounds with PAO

| | | Compound | | | | | |
|---|---|---|---|---|---|---|---|
| | | 1 | 2 | 3 | 4 | 5 | 6 |
| Mooney Viscosity, 100° C. 4 min, 1 min preheat | | | | | | | |
| ML 1 + 4 | [MU] | 55.1 | 46.7 | 49.4 | 41.2 | 42.9 | 52 |
| Mooney Scorch @ 135° C. | | | | | | | |
| t5 | | 16.01 | 17.26 | 16.54 | 19.04 | 18.25 | 9.65 |
| t10 | | 18.51 | 19.92 | 19.04 | 21.83 | 20.94 | 13.56 |
| MDR @ 160° C. | | | | | | | |
| ML | [dNm] | 1.29 | 1.06 | 1.22 | 0.94 | 1.01 | 1.33 |
| MH | [dNm] | 4.51 | 4.01 | 4.22 | 3.68 | 3.67 | 4.83 |
| ts2 | [min] | 6.18 | 7.13 | 6.84 | 8.12 | 8.4 | 5.94 |
| tc50 | [min] | 5.11 | 5.26 | 5.14 | 5.54 | 5.43 | 5.46 |
| tc90 | [min] | 12.42 | 13.56 | 13.37 | 13.12 | 13.61 | 12.58 |
| Cold Brittleness | [° C.] | −41 | −44.6 | −42.2 | −46.2 | −44.2 | −45.4 |
| Tensile | [Mpa] | 8.69 | 8 | 8.81 | 8.37 | 8.72 | 9.38 |
| 100% Modulus | [Mpa] | 0.88 | 0.73 | 0.85 | 0.72 | 0.75 | 0.99 |
| 300% Modulus | [Mpa] | 2.47 | 2.02 | 2.5 | 2.12 | 2.14 | 2.92 |
| % Elongation | [%] | 843 | 855 | 874 | 864 | 860 | 818 |
| MOCON @ 60° C. | | | | | | | |
| cc*mm/(m$^2$-day-mmHg) | | 0.5669 | 0.8214 | 0.6396 | 1.2916 | 1.0995 | 1.2581 |

TABLE 9-continued

Properties of Model Tire Innerliner Compounds with PAO

| | | Compound | | | | | |
|---|---|---|---|---|---|---|---|
| | | 7 | 8 | 9 | 10 | 11 | 12 |
| Mooney Viscosity, 100° C. 4 min, 1 min preheat | | | | | | | |
| ML 1 + 4 | [MU] | 42.1 | 46.5 | 37.1 | 38.9 | 31.5 | 33.4 |
| Mooney Scorch @ 135° C. | | | | | | | |
| t5 | | 11.28 | 11.49 | 12 | 12.95 | 14.17 | 15.74 |
| t10 | | 15.95 | 15.91 | 17.08 | 17.69 | 19.35 | 20.58 |
| MDR @ 160° C. | | | | | | | |
| ML | [dNm] | 1.07 | 1.21 | 0.92 | 0.99 | 0.75 | 0.82 |
| MH | [dNm] | 4.14 | 4.57 | 3.93 | 3.83 | 3.39 | 3.37 |
| ts2 | [min] | 6.74 | 6.62 | 7.15 | 7.28 | 8.24 | 8.75 |
| tc50 | [min] | 5.67 | 5.93 | 5.91 | 5.68 | 6.04 | 6.04 |
| tc90 | [min] | 10.58 | 11.21 | 10.98 | 10.72 | 11.1 | 11.21 |
| Cold Brittleness | [° C.] | −48.2 | −47 | −47 | −47.8 | −50.2 | −48.2 |
| Tensile | [Mpa] | 8.84 | 9.22 | 7.93 | 8.28 | 7.2 | 7.72 |
| 100% Modulus | [Mpa] | 0.83 | 0.98 | 0.7 | 0.7 | 0.54 | 0.64 |
| 300% Modulus | [Mpa] | 2.5 | 3 | 2.04 | 2.07 | 1.45 | 1.86 |
| % Elongation | [%] | 823 | 777 | 808 | 846 | 903 | 838 |
| MOCON @ 60° C. | | | | | | | |
| cc*mm/(m²-day-mmHg) | | 1.2415 | 1.0868 | 1.3883 | 1.4979 | 2.1283 | 1.7792 |

As seen in Example 2 and 3, the brittleness temperature was lowered by the addition of the PAO at all levels, no matter what level of halobutyl the composition contained. The brittle point of a 100 phr halobutyl recipe with PAO was lowered to the level of a 80 phr recipe without PAO. The brittle point of an 80 phr halobutyl 20 phr natural rubber with PAO was lowered to the level of a 60 phr halobutyl 40 phr natural rubber recipe without PAO. The permeability of the 80 phr halobutyl recipe was improved with the addition of up to 12 phr of PAO.

Figure 2:
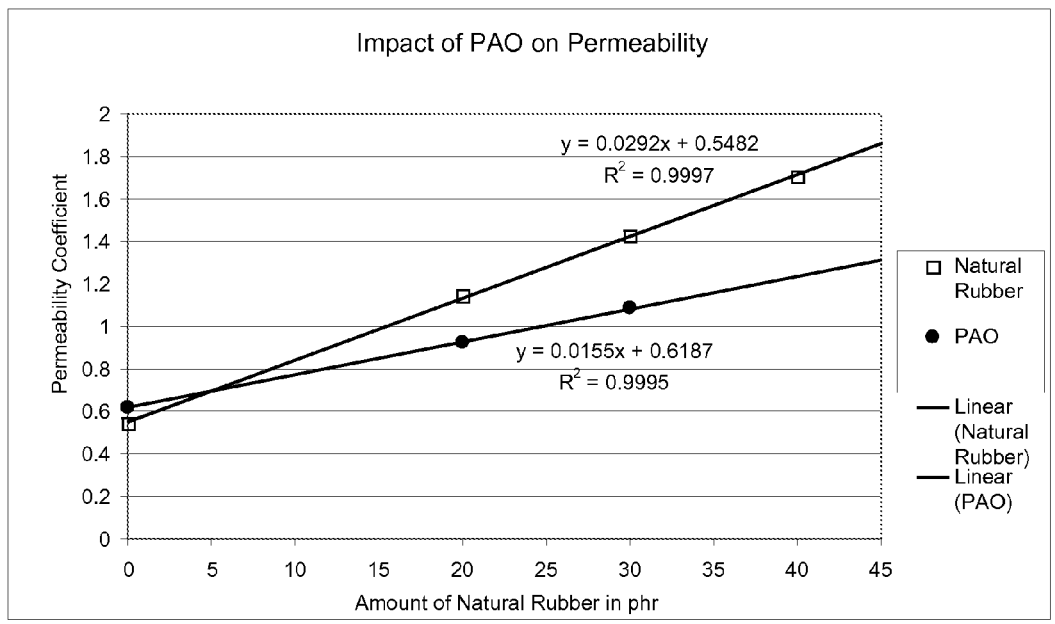
FIG. 2 is a graph illustrating the impact on an elastomeric composition's permeability when the composition contains PAO and varying amounts of natural rubber.
Figure 3:
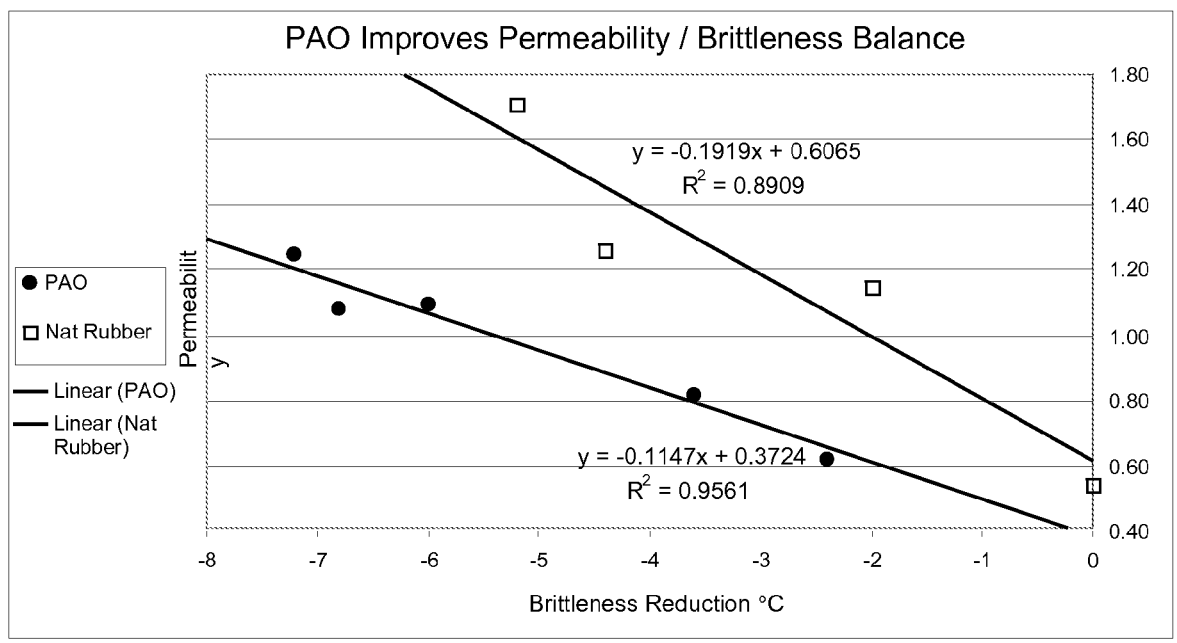
FIG. 3 is a graph illustrating the improvement in an elastomeric composition's brittleness/permeability balance that is obtained when the composition comprises PAO.

The data from the Examples was used to create FIGS. 1, 2, and 3.

All patents, publications, and patent applications, test procedures (such as ASIM methods), and other documents cited herein are fully incorporated by reference to the extent such disclosure is not inconsistent with this invention and for all jurisdictions in which such incorporation is permitted. All priority documents, EXCEPT U.S. Ser. No. 11/791,885 AND 60/639,939, are fully incorporated by reference to the extent such disclosure is not inconsistent with this invention and for all jurisdictions in which such incorporation is permitted.

When numerical lower limits and numerical upper limits are listed herein, ranges from any lower limit to any upper limit are contemplated.

While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which the invention pertains.

What is claimed is:

1. A cured elastomeric composition for use in a tire innerliner, comprising:
   a. from 50 to 100 phr of at least one isobutylene-based elastomer;
   b. less than or equal to 50 phr of natural rubber; and
   c. from 1 to 30 phr of at least one hydrocarbon fluid additive, wherein the hydrocarbon fluid additive has a flash point of at least 200° C., a pour point of less than or equal to −15° C., and specific gravity at 15.6° C. of less than or equal to 0.880;

wherein the cured elastomeric composition has a MOCON permeability coefficient of less than or equal to T, where T=−0.1147Y+0.54 where Y is the change in brittleness determined by subtracting the brittleness in 0° C. of the cured elastomeric composition containing the hydrocarbon fluid additive from the brittleness in 0° C. of a cured composition having the same components except that it contains a naphthenic oil having a flash point in the range of 160 to 170° C., a pour point of about −40° C.±5%, and a specific gravity at 15.6° C. of about 0.91±0.01 instead of the hydrocarbon fluid additive.

2. The cured elastomeric composition of claim 1, wherein the isobutylene-based elastomer is selected from the group consisting of butyl rubber, halogenated butyl rubber, star-branched butyl rubber, halogenated star-branched butyl rubber, poly(isobutylene-co-p-methylstyrene), halogenated poly(isobutylene-co-p-methylstyrene), and mixtures thereof.

3. The cured elastomeric composition of claim 1, wherein the composition comprises less than or equal to 10 phr of natural rubber.

4. The cured composition of claim 1, wherein the hydrocarbon fluid additive is selected from a group consisting of polyalphaolefins, high purity hydrocarbon fluids, water white group III mineral oils, and blends thereof.

5. The cured elastomeric composition of claim 1, wherein the hydrocarbon fluid additive is a polyalphaolefin having a Kinematic viscosity at 100° C. of at least 4 cSt.

6. The cured elastomeric composition of claim 1, wherein the hydrocarbon fluid additive is a polyalphaolefin having a Kinematic viscosity at 100° C. in the range of 6 to 40 cSt.

7. The cured elastomeric composition of claim 1, wherein the hydrocarbon fluid additive is a polyalphaolefin having a viscosity index of at least 120.

8. The cured elastomeric composition of claim 1, wherein the composition is substantially free of naphthenic oil and/or is substantially free of aromatic oil.

9. The cured elastomeric composition of claim 1, wherein the composition further comprises one or more filler components selected from calcium carbonate, mica, silica, silicates, talc, titanium dioxide, starch, wood flour, carbon black, and mixtures thereof.

10. The cured elastomeric composition of claim 1, wherein the composition is a tire innerliner suitable for use in an aircraft tire.

11. A cured elastomeric composition for use in a tire innerliner, comprising:
    a. from 50 to 90 phr of at least one isobutylene-based elastomer;
    b. from 1 to 50 phr of natural rubber; and
    c. from 1 to 30 phr of at least one hydrocarbon fluid additive, wherein the hydrocarbon fluid additive has a flash point of at least 200° C., a pour point of less than or equal to $-15°$ C., and specific gravity at 15.6° C. of less than or equal to 0.880;
wherein the cured elastomeric composition has a MOCON permeability coefficient of less than or equal to Z, where $Z=0.282X+0.4817$ where X is the amount of natural rubber in phr, and wherein the cured elastomeric composition has a brittleness of less than or equal to A, where $A=-0.13\times51$ where X is the amount of natural rubber in phr.

12. The cured elastomeric composition of claim 11, wherein the composition comprises from 70 to 90 phr of the isobutylene-based elastomer.

13. The cured elastomeric composition of claim 11, wherein the isobutylene-based elastomer is selected from the group consisting of butyl rubber, halogenated butyl rubber, star-branched butyl rubber, halogenated star-branched butyl rubber, poly(isobutylene-co-p-methylstyrene), halogenated poly(isobutylene-co-p-methylstyrene), and mixtures thereof.

14. The cured elastomeric composition of claim 11, wherein the composition comprises from 10 to 30 phr of natural rubber.

15. The cured composition of claim 11, wherein the hydrocarbon fluid additive is selected from a group consisting of polyalphaolefins, high purity hydrocarbon fluids, water white group III mineral oils, and blends thereof.

16. The cured elastomeric composition of claim 11, wherein the hydrocarbon fluid additive is a polyalphaolefin having a Kinematic viscosity at 100° C. of at least 4 cSt.

17. The cured elastomeric composition of claim 11, wherein the hydrocarbon fluid additive is a polyalphaolefin having a Kinematic viscosity at 100° C. in the range of 6 to 40 cSt.

18. The cured elastomeric composition of claim 11, wherein the hydrocarbon fluid additive is a polyalphaolefin having a viscosity index of at least 120.

19. The cured elastomeric composition of claim 11, wherein the composition is substantially free of naphthenic oil and/or is substantially free of aromatic oil.

20. The cured elastomeric composition of claim 11, wherein the composition further comprises one or more filler components selected from calcium carbonate, mica, silica, silicates, talc, titanium dioxide, starch, wood flour, carbon black, and mixtures thereof.

21. The cured elastomeric composition of claim 11, wherein the composition is a tire innerliner suitable for use in an aircraft tire.

22. A process for producing an air barrier comprising the steps of:
    a. combining from 50 to 90 phr of at least one isobutylene-based elastomer, from 1 to 50 phr of natural rubber, and from 1 to 30 phr of at least one hydrocarbon fluid additive, wherein the hydrocarbon fluid additive has a flash point of at least 200° C., a pour point of less than or equal to $-15°$ C., and specific gravity at 15.6° C. of less than or equal to 0.880;
    b. curing the combined components to form a cured elastomeric composition wherein the cured elastomeric composition has a MOCON permeability coefficient of less than or equal to Z, where $Z=0.282X+0.4817$ where X is the amount of natural rubber in phr, and wherein the cured elastomeric composition has a brittleness of less than or equal to A, where $A=-0.13\times51$ where X is the amount of natural rubber in phr; and
    c. shaping the cured elastomeric composition to form the air barrier.

23. The process of claim 22, wherein the air barrier is an innerliner suitable for use in an aircraft tire.

24. An aircraft tire comprising an innerliner which comprises:
    a. from 50 to 90 phr of at least one isobutylene-based elastomer;
    b. from 1 to 50 phr of natural rubber; and
    c. from 1 to 30 phr of at least one hydrocarbon fluid additive, wherein the hydrocarbon fluid additive has a flash point of at least 200° C., a pour point of less than or equal to $-15°$ C., and specific gravity at 15.6° C. of less than or equal to 0.880;
wherein the aircraft tire has a MOCON permeability coefficient of less than or equal to Z, where $Z=0.282X+0.4817$ where X is the amount of natural rubber in phr, and wherein the cured elastomeric composition has a brittleness of less than or equal to A, where $A=-0.13X-51$ where X is the amount of natural rubber in phr.

25. The aircraft tire of claim 24, wherein the innerliner is substantially free of naphthenic oil and/or is substantially free of aromatic oil.

26. The aircraft tire of claim 24, wherein the innerliner is substantially free of naphthenic oil.

27. The aircraft tire of claim 24, wherein the innerliner is substantially free of aromatic oil.

* * * * *